US007613797B2

United States Patent
Stefaniak et al.

(10) Patent No.: US 7,613,797 B2
(45) Date of Patent: Nov. 3, 2009

(54) REMOTE DISCOVERY AND SYSTEM ARCHITECTURE

(75) Inventors: Joseph Peter Stefaniak, San Clemente, CA (US); Eugene Otto Mutschler, III, San Clemente, CA (US); Jonathan Virgil Ziebell, Trabuco Canyon, CA (US); Mahmood Mac Vazehgoo, Laguna Niguel, CA (US); Robert Mathews Harrison, San Juan Capistrano, CA (US); Jeffrey Allen Moore, Mission Viejo, CA (US); Charles Eugene Steel, La Habra, CA (US)

(73) Assignee: Unisys Corporation, Blue Bell, PA (US)

( * ) Notice: Subject to any disclaimer, the term of this patent is extended or adjusted under 35 U.S.C. 154(b) by 867 days.

(21) Appl. No.: 10/549,652

(22) PCT Filed: Mar. 19, 2004

(86) PCT No.: PCT/US2004/008496

§ 371 (c)(1),
(2), (4) Date: Sep. 16, 2005

(87) PCT Pub. No.: WO2004/086184

PCT Pub. Date: Oct. 7, 2004

(65) Prior Publication Data

US 2006/0179124 A1 Aug. 10, 2006

Related U.S. Application Data

(60) Provisional application No. 60/455,749, filed on Mar. 19, 2003.

(51) Int. Cl.
*G06F 15/177* (2006.01)
(52) U.S. Cl. .................................................. 709/221
(58) Field of Classification Search ................. 709/217, 709/221; 707/10
See application file for complete search history.

(56) References Cited

U.S. PATENT DOCUMENTS 5,522,042 A * 5/1996 Fee et al. .................... 709/226

(Continued)

FOREIGN PATENT DOCUMENTS

EP 1258804 A1 * 11/2002

OTHER PUBLICATIONS

International Search Report, Mar. 28, 2005.

*Primary Examiner*—George C Neurauter, Jr.
(74) *Attorney, Agent, or Firm*—James E. Goepel; Robert P. Marley

(57) ABSTRACT

Sending a discovery agent to a computing device determines the services provided by that first computing device. As a result, a first set of information is received from the agent that provides information indicative of the services provided by the computing device. That information can then be compared to other information, either from the same computing device at a different point in time, or from a second computing device. The other information is indicative of services performed by that computing device at a different point in time or the second computing device. From that, services provided by the computing device that were previously different on the first computing device or that are not available on the second computing device can be determined.

22 Claims, 20 Drawing Sheets

U.S. PATENT DOCUMENTS

| | | | |
|---|---|---|---|
| 5,655,081 A * | 8/1997 | Bonnell et al. | 709/202 |
| 5,696,701 A * | 12/1997 | Burgess et al. | 714/25 |
| 5,758,071 A * | 5/1998 | Burgess et al. | 709/220 |
| 5,781,703 A * | 7/1998 | Desai et al. | 706/50 |
| 5,787,300 A * | 7/1998 | Wijaya | 712/1 |
| 5,796,633 A * | 8/1998 | Burgess et al. | 702/187 |
| 5,923,850 A * | 7/1999 | Barroux | 709/224 |
| 6,122,639 A * | 9/2000 | Babu et al. | 707/103 R |
| 6,230,210 B1 * | 5/2001 | Davies et al. | 709/248 |
| 6,236,983 B1 | 5/2001 | Hofmann et al. | |
| 6,269,456 B1 | 7/2001 | Hodges et al. | |
| 6,301,615 B1 * | 10/2001 | Kutcher | 709/224 |
| 6,336,138 B1 | 1/2002 | Caswell et al. | |
| 6,442,584 B1 * | 8/2002 | Kolli et al. | 718/104 |
| 6,490,617 B1 * | 12/2002 | Hemphill et al. | 709/223 |
| 6,643,669 B1 * | 11/2003 | Novak et al. | 707/201 |
| 6,760,763 B2 * | 7/2004 | Jennings et al. | 709/224 |
| 6,839,564 B2 * | 1/2005 | Sutinen et al. | 455/502 |
| 6,920,492 B2 * | 7/2005 | Richard | 709/220 |
| 6,988,134 B2 * | 1/2006 | Thorpe et al. | 709/223 |
| 7,024,450 B1 * | 4/2006 | Deo et al. | 709/203 |
| 7,228,306 B1 * | 6/2007 | Altman et al. | 707/100 |
| 2003/0065760 A1 * | 4/2003 | Casper et al. | 709/223 |
| 2003/0110205 A1 * | 6/2003 | Johnson | 709/104 |
| 2003/0149709 A1 * | 8/2003 | Banks | 707/200 |

* cited by examiner

REMOTE DISCOVERY AND SYSTEM ARCHITECTURE

CROSS REFERENCE TO RELATED APPLICATION

The present application claims priority to U.S. Provisional Application No. 60/455,749, filed Mar. 19, 2003, "discovery and Analysis of System and Database Inventories for Server Consolidation," which is hereby incorporated by reference in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Unisys Corp.

1. Field of the Invention

The present invention relates to the field of computing systems and, more specifically, to systems and methods for server consolidation.

2. Background of the Invention

As technology has become more prevalent in business organizations, organizations have created server farms in an ad hoc fashion. For instance, as a new application become available or needed, organizations often add a new server to provide the computing support for that application. Often times, the server would have enough computing power only to run that particular application. Such ad hoc server farms become an unwieldy combination of overlapping applications, multiple versions of the same application, redundant data storage and disparate computing power. The result is duplicate applications and incompatible hardware. In some cases, businesses may not even have a complete understanding of their computing inventory.

Ideally, an organization's server farms would be a more homogeneous group of servers and applications with applications adequately balanced across the servers in the most efficient and effective way. But more typically, companies have an eclectic mix of computing products and hardware. The result is not only an inefficient computing system but also a burdened staff that needs to be proficient on all of the various hardware and software applications. To confront the issue, organizations are consolidating their applications onto fewer, larger servers that have increased availability and scalability.

Server consolidation can provide significant benefits, including a reduction in the total cost of ownership, creation of a streamlined, manageable operation, increased system reliability, increased capacity utilization, and so on. Server consolidation can give an enterprise the ability to scale processing and storage capacity without adding physical devices or subsystems, as well as the flexibility to partition and allocate resources as needed. Server consolidation can lead to a standardized computing environment, reducing the number of platforms, consolidating software products and system interfaces, and centralizing operation and systems management procedures. The result is a reduction in staff training.

Server consolidation generally can be physical or logical consolidation. Physical consolidation extends a system's scalability and logical consolidation migrates multiple applications or databases into a centralized application or database. In addition, Physical consolidation can thought of as two major sub-categories, server consolidation and storage consolidation. Physical server consolidation takes a number of servers and places their operating system instances into partitions or domains of a larger server. Storage consolidation combines data from different sources into a single repository and format. Storage is one of today's most important asset-procurement considerations in the data center, with costs that can often rival or exceed server costs. Since the economic life of the storage exceeds that of most servers, today's storage decisions will affect operations for years to come.

For example, if a given server has excess capacity additional applications can be moved to that server resulting in a reduction of the overall physical number of servers. Moreover, organizations typically configure systems to run at 50 to 60% utilization, leaving the extra capacity for peak workloads. If this unused capacity on various servers is consider for the number of servers in a large server farm, the amount of wasted resources can be enormous. By consolidating servers, the amount of unused capacity drops as dramatically as the number of servers no longer needed.

The subject patent document describes various methods and systems for automating aspects of server consolidation.

SUMMARY OF THE INVENTION

The above-mentioned features are provided by a system and method for consolidating services performed on a plurality of computing devices such as servers in a server farm. The system and methods operate by sending a discovery agent to one of the computing devices, a first computing device, to determine the services provided by that first computing device. As a result, a first set of information is received from the agent that provides information indicative of the services provided by the first computing devices. That information can then be compared to other information, either from the same computing device at a different point in time, or from a second computing device. The other information is indicative of services performed by that first computing device at a different point in time or the second computing device. From that, services provided by the first computing device that were previously different on the first computing device or that are not available on the second computing device can be determined.

As a result, the services performed by the first or second computing device can be changed to include the at least one service. In the case of the second computing device, the service can then be provided by the second computing device and removed from the first computing device.

The discovery agent comprises computer executable instructions for determining the system, process and/or database characteristics of the first computing device and is executed by way of a remote procedure call.

BRIEF DESCRIPTION OF THE DRAWINGS

A consolidation system and method in accordance with the invention is further described below with reference to the accompanying drawings, in which.

DETAILED DESCRIPTION OF ILLUSTRATIVE EMBODIMENTS

A detailed description of illustrative embodiments of the present invention will now be described with reference to FIGS. 1-19. Although this description provides detailed examples of possible implementations of the present invention, it should be noted that these details are intended to be exemplary and in no way delimit the scope of the invention.

Figure 1:
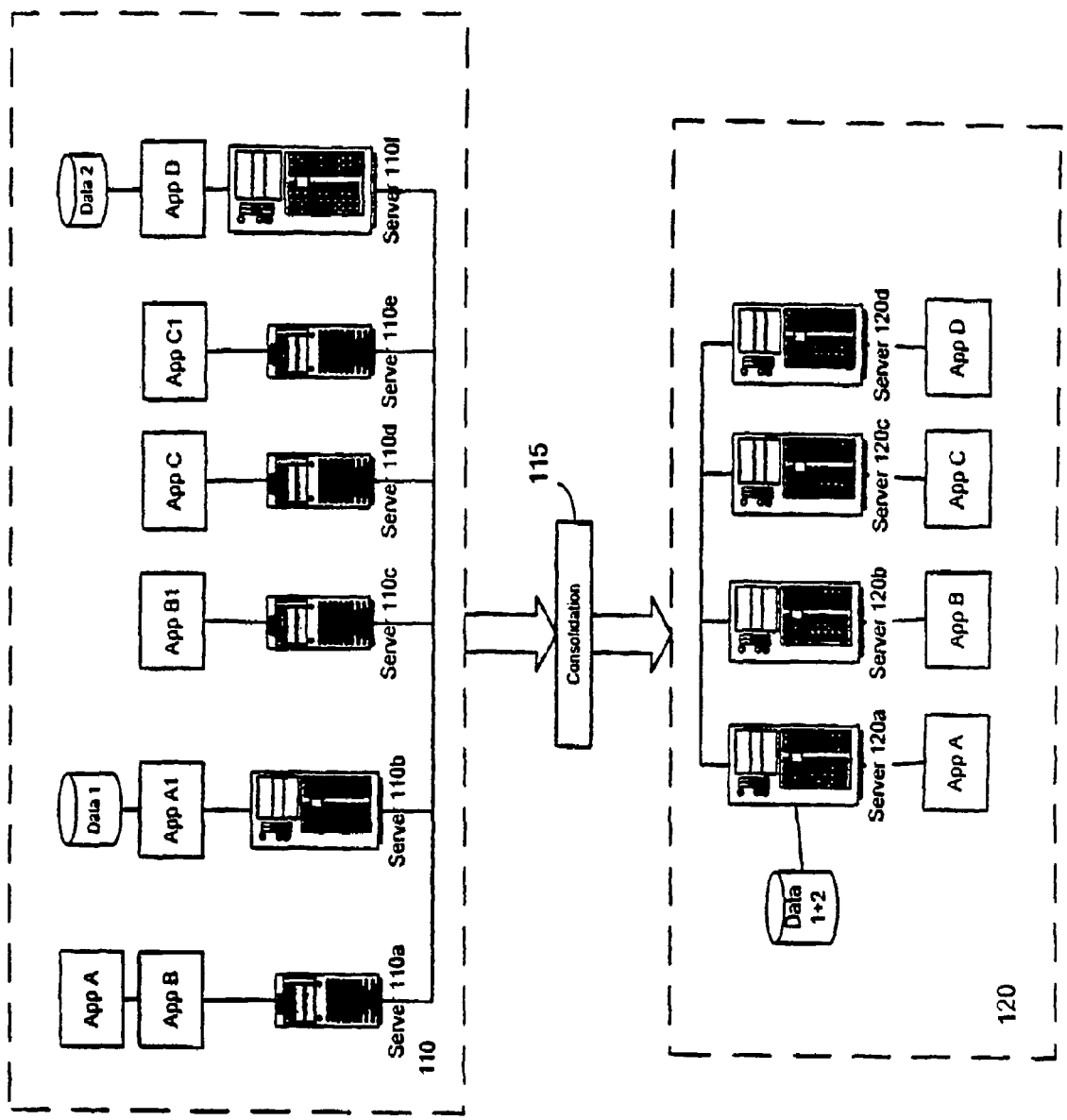
FIG. 1 illustrates an exemplary diagram of a server farm consolidation.

FIG. 1 provides an overview of a primary aspect of the subject invention. In general, a consolidation service 115 is applied to a first server farm 110 to inventory the hardware, software, and data in that server farm. Aspects of that information are used to consolidate the server farm 110 into a second server farm 120. The second server farm 120 may represent a consolidation of the hardware, software, data, or some combination of those items. The consolidation service 115 helps to automate aspects of the consolidation through a process of discovering what features are present in the first server farm 110, providing an organized way of analyzing the discovered features to determine redundancies, utilization of resources, etc., and providing tools to assist in the deployment of the second, consolidated server farm.

A typical server farm, e.g., server farm 110 may have a variety of servers 110a through 110f. The servers 110a through 110f in the example server farm 110 may be of a variety of manufacturers, capabilities, power, etc. Moreover, as illustrated, the various servers contain a mix of applications and data. For example, server 110a runs applications App A and App B, server 110b runs application App A1 and maintains database Data 1, server 110c runs application App B1, server 110d runs applications App C, server 110e runs application App C1, and server 110f runs application App D and maintains database Data 2. Notably, the various applications may be various versions of the same application. For example, application App A1 may be another instance of application App A, whether the same or different version. Similarly application App B1 may be another instance of application App B. Additionally, databases Data 1 and Data 2 may have a number of fields in common such that the two databases could be merged into a single database.

As noted above, consolidation service 115 provides tools to discover the various servers, hardware configuration, applications, databases, etc. contained with in server farm 110 for the primary purpose of consolidating the server farm 110 into server farm 120.

Server farm 120 provides at least all of the functionality previously provided by server farm 110, unless of course some of the functionality was intentionally removed during the consolidation. In the consolidated server farm 120, hardware may be combined, eliminated, upgraded etc. Similarly, applications may be consolidated to run on a single server, eliminated, or various version of a single application upgraded and combined, e.g., applications App A and App A1 have been consolidated into application App A and applications App B and App B1 have been consolidated into application App B. Additionally, database Data 1 and Data 2 have been consolidated into database Data 1+2.

Figure 2:
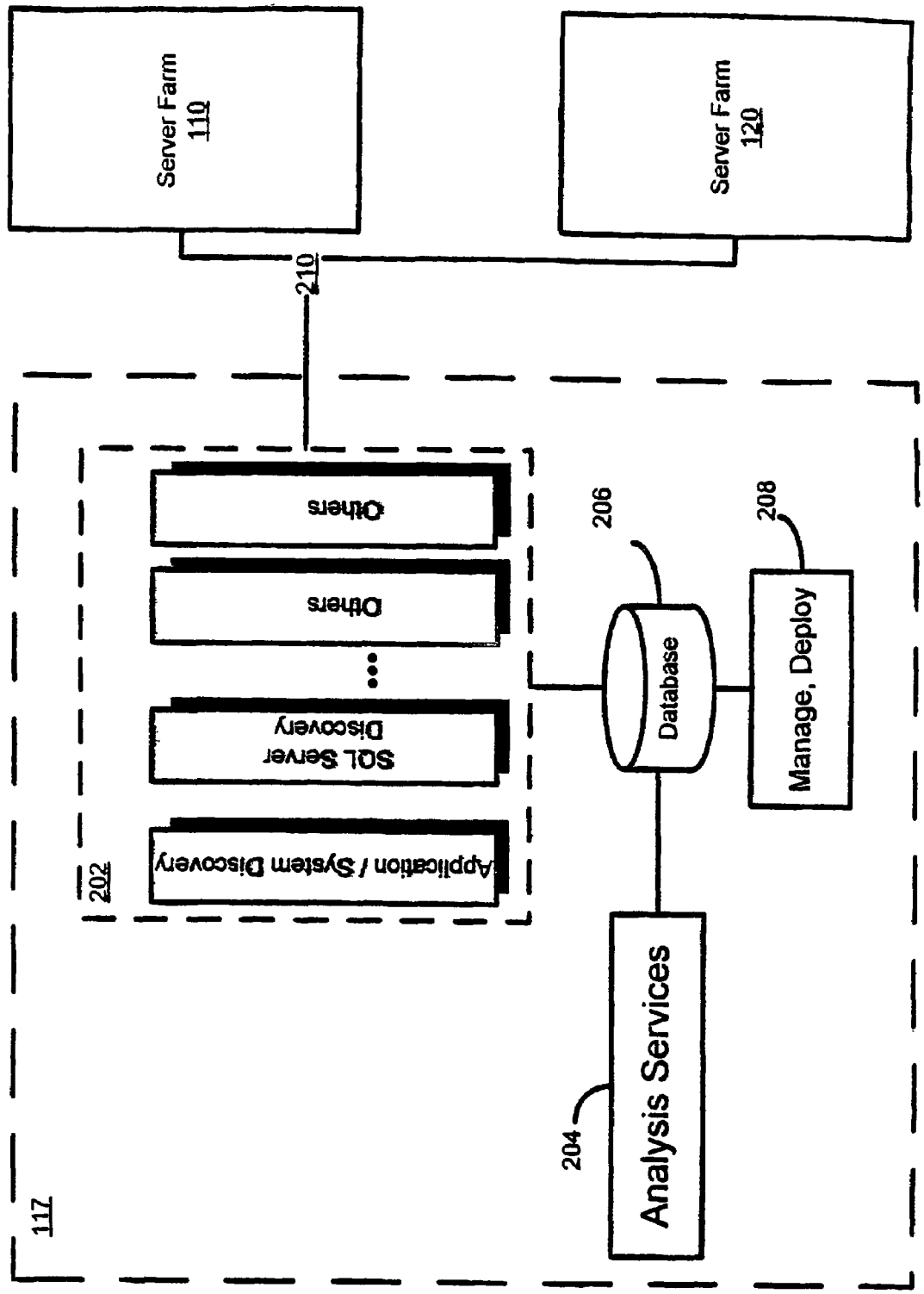
FIG. 2 illustrates further detail of a consolidation system such as would be used in the consolidation in FIG. 1.

FIG. 2 further illustrates aspects of the consolidation service running on a consolidation management system 117. Consolidation system 117, runs on one or more computing devices. The computing devices are coupled to server farm 110 via network 210. Of course, showing the consolidation system 117 as separate from the server farm is for illustration purposes only. Naturally, the service could run a server or system within the server farm or without the server farm. Additionally, server farms 110 and 120 are shown as separate server farms to illustrate the transformation that the consolidation service facilitates. In many instances, the server farm 120 will be an update and consolidation of server farm 110 itself. That is, many of the servers in the server farm will be reused and or redeployed in the consolidated server farm.

Discovery services 202 that run as part of the consolidation service comprise a variety of discovery services, e.g., Application/System Discovery, SQL Server Discovery, and so on. The various discovery services are agents that are dispensed over network 210 to discover and inventory the various assets in the server farm, e.g., server farm 110. The discovered information on the various servers, e.g., 110a-110f, are then stored in consolidation database 206. After a sufficient portion of the assets on the server farm has been discovered, analysis service 204 can then be used to analyze various aspects of the server farm. Finally, the analyzed information can be used to manage and deploy a consolidated server farm, e.g., server farm 120.

Primarily, there are two types of inventory agents: System and Application Agent and SQL Server Discovery Agent. There could be other agent types as well. For example, an agent type could be designed to gather information on Oracle databases, IBM databases, Object oriented databases, etc. Together these agents capture a number of data points relative to system hardware, application and database configurations in a Microsoft Windows operating environment, a Unix environment, or a Linux environment. The System and Application Agent assists in the process of retrieving those data points necessary for analyzing existing applications to determine their suitability for consolidation and to assist in the design of a consolidated application infrastructure. System and Application Agent facilitates the capture of a detailed inventory of the client's existing server estate, including servers, applications, databases, devices, processors, memory and much more including the relationships of such information as defined in the System and Application Agent Inventory Model (described in further detail in connection with FIG. 16A herein below). The SQL Server Discovery agent assists in the process of retrieving those data points necessary for analyzing existing SQL Server database implementations to determine their suitability for consolidation and to assist in the design of a consolidated SQL Server infrastructure. Although the operation of the database discovery agent is described herein with reference to Microsoft SQL Server, the description and characteristics of the agent also apply to Oracle database systems, suitably tailored to the particular characteristics of Oracle systems.

SQL Database Agent facilitates the capture of a detailed inventory of the client's existing SQL Server estate, including servers, SQL instances, databases, users and much more much more including the relationships of such information as defined in the Database Inventory Model (described in further detail in connection with FIG. 16B herein below).

Figure 3:
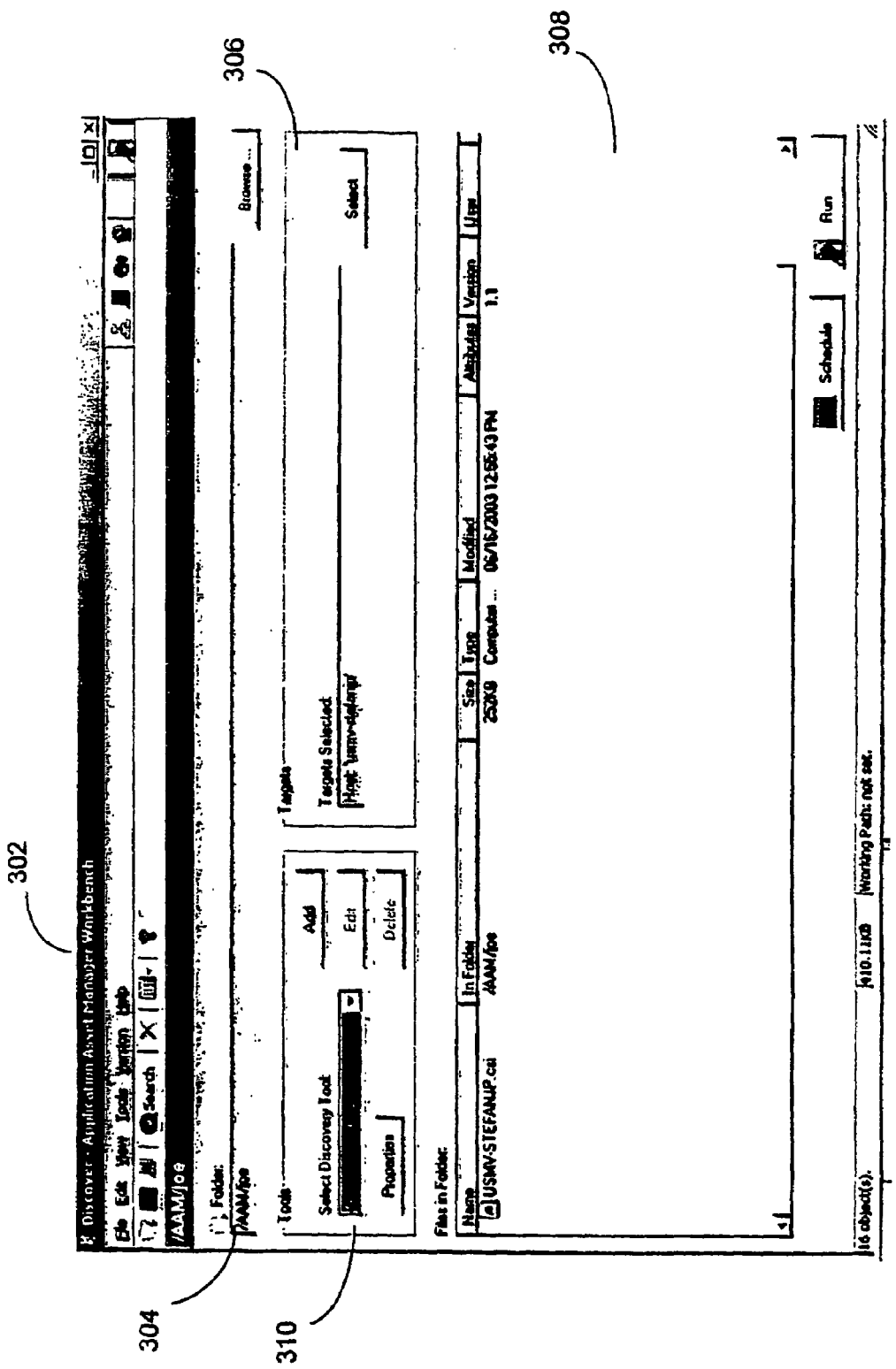
FIG. 3 is an exemplary user interface for invoking the discovery aspect of the server consolidation.

FIG. 3 provides an illustrative invocation screen to set up and start the discovery process. Window 302 provides various user interface mechanisms to allow a user to control the discovery process. Folder portion 304 allows a user to select a storage location for the collected discovery data, e.g., folder "/AAM/joe". Target box 306 displays the name of the selected target server. Box 308 displays the list of files in the selected folder. And tools portion 310 allows a user to select the discovery tool to use. In this example, the user has selected "discover System." The user could have selected an alternative discovery such as "Discover Database."

Notably, the targets box 306 illustrates on technique for specifying a target server by host name. Other techniques are also possible. For example, the system 117 could accept a comma separated list of servers or the system could query the domain controller and obtain a subnet list of IP addresses in the server farm. In general, the servers could be identified by host name, host list, TCP/IP subnet, Microsoft Active Directory site name, or domain name. Host name enables the user to select a single server for inventory. In that instance, the user specifies the name of the host machine, and a user name and password with administrator privileges. Host list enables a user to select a group of servers from a host list for inventory. TCP/IP subnet enables a user to select all servers within a specific TCP/IP subnet. In that instance, the user enters the network subnet address and a user name and password with administrator privileges for all systems in the subnet. Site name, enables a user to select all servers in a specific site. In this instance, a user enters the site name and a user name and password with administrator privileges for all systems within the site. Domain name enables a user to select all servers in a domain. The user of the discovery tool must enter the domain name and a user name and password with administrator privileges for all systems within the domain. After determining the list of server addresses in the server farm, e.g., server farm 110, the system logs-in to the target server, e.g., 110a, and invokes the discovery process.

In general, the user will have to login to a target server as an administrator to complete the discovery process. Hence, the discovery service will have to have access to an administrator account and password. This account and password will in general, but not necessarily be the same on all of the servers throughout the server farm, e.g., server farm 110. The discovery process looks up account name and password information for each system as it is processed. As a result, the login process can be automated to login to each of the plurality of servers 110a-110f in server farm 110 using the username and password and thereafter invoking the discovery process. The discovery operation generally requires the organization to make available an existing user ID and password or create a new user ID and password for the servers that are targeted for discovery. The user ID should have administrator privileges, including the rights to debug programs and to load and unload device drivers, and can be removed from the systems as soon as the discovery task is completed The Discovery tool launches a remote agent into each designated servers, e.g., 110a, to capture information about all of the applications and processes running in that system. The agent writes the captured information back to the consolidation computer system 117 as an XML file, where it is stored in consolidation database 206. The remote agent is then removed from the target server, e.g., 110a, leaving no trace of itself.

The discovery process generally employs remote procedure calls (RPC), interprocess communication (IPC), and named pipes to tightly couple the parent process running on one computing device (i.e. the computing device hosting the consolidation system 117) with the server computer, e.g., 110a, that is being discovered. RPC enables applications to call functions remotely. Therefore, RPC makes RPC as easy as calling a function. RPC operates between processes on a single computer or on different computers on a network.

Named pipes are used to transfer data between processes that are not related processes and between processes on different computers. Typically, a named-pipe server process creates a named pipe with a well-known name or a name that is to be communicated to its clients. A named-pipe client process that knows the name of the pipe can open its other end, subject to access restrictions specified by named-pipe server process. After both the server and client have connected to the pipe, they can exchange data by performing read and write operations on the pipe.

Discovery is the process of harvesting system information and information about running processes on specified servers located in a server farm, and storing the information in database 206 of FIG. 2. As the discovery operation finishes on each target server, the agent is removed from the server and the link to the server from the external system is terminated. In summary, no trace of the discovery operation should remain in the organization's system.

Multiple discoveries can be done by scheduling discovery at specific time intervals to capture those applications or processes that run only at a particular time or the discovery operation can be run again manually. Each time the discovery operation is repeated, a new revision of the server XML file is created. All revisions are stored and available in the version history.

The type of information discovered by Application and Process Discovery includes hardware information, such as the number of processors on a given system, available processors on a given system, processor level and revision, devices, disk drive characteristics and capacities, as so on. System information discovered includes system name, page size, operating system version, operating system build, network connectivity, and so on. Process and dependency information discovered includes active processes and their associated dependencies (both component and configuration), processor usage at both the system and the process level, memory usage at both the system and the process level, process creation time, process ID, process owner, process handles, process and dependency versions and timestamps, process and dependency descriptions.

SQL Server Database discovery is designed to facilitate SQL server Consolidation. It automates much of the information gathering and analysis process. It complements the information gathered through Process discovery. The information gathered is a detailed inventory of the customer's existing SQL Server estate—Servers, Instances, Databases, User and so on. The information collected is stored in database 206 and is used by consolidation system 117 during the analysis process.

Figure 4:
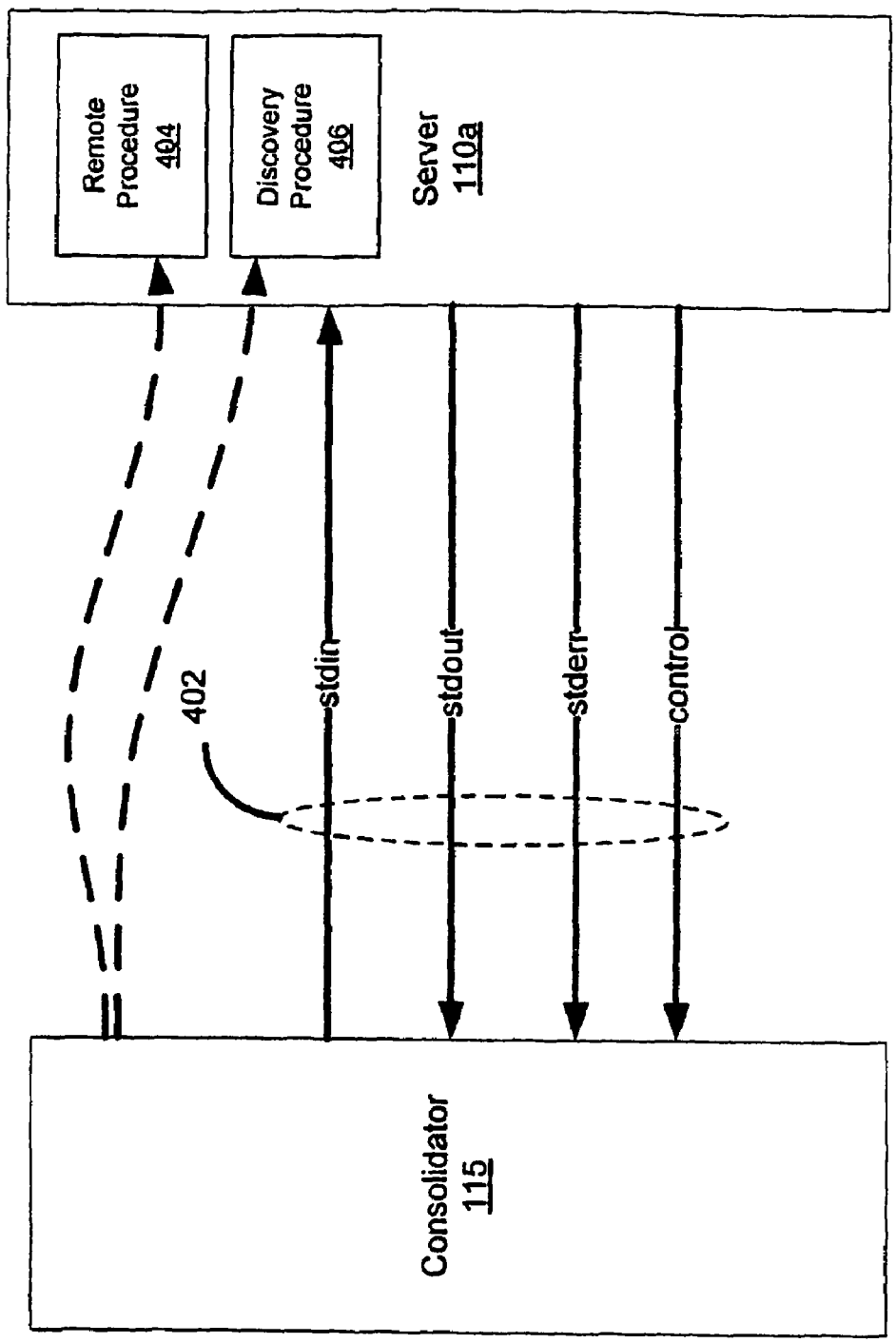
FIG. 4 is a block diagram illustrating aspects of the discovery deployment aspect of the system.

FIG. 4 further illustrates aspects of the discovery process. The target server, e.g., 110*a*, is preferably selected through a GUI interface as part of the overall discovery process. A selected discovery agent 406 is pushed on the target server with a privileged user account and starts collecting information into an XML file format on client machine. The XML file is stored in consolidation database 206 with a tracking version. As part of the load process, the information in the XML file is read and transformed into a series of relational records and stored in a cache database for query purposes.

The consolidation database 206 is used to store the information collected from target SQL servers. The database type is preferably a relational database. In addition and not to be confused with consolidation database 206, there are target databases, e.g., target SQL server databases: Such databases are the instances where the inventory is taken from. To access these databases, the database discovery process requires SQL admin privileges account on the target SQL server.

To connect to an instance of SQL Server, typically two or three pieces of information are required, including the network name of the computer on which the SQL Server instance is running, and the instance name (this is necessary in the case where only a particular instance is to be discovered).

Initially, after login, consolidation system 117 copies a procedure over to the target server, e.g., 110*a*. In particular, it copies a remote service executable program 404 to admin$ share on the server computer. Thereafter, four named pipes 402 are started up as shown in FIG. 4 between the remote service 404 and consolidation system 117. The four named pipes 402, stdin, stdout, stderr, and control are used to facilitate communication between the consolidation system 117 and the server 110*a*. The remote service 404 establishes the connection between consolidation system 117 and server 110*a* using the named pipes 402. After the named pipes 402 have been established, a discovery procedure 406, e.g., the discovery procedure selected from the tools box 310 in FIG. 3, is copied to sever 110*a*.

When the discovery process 406 is in place on target server 110*a*, the control pipe is used to run discovery procedure 406. The named pipes 402, i.e. stdin, stdout, stderr, and control are routed to the discovery procedure. The discovery process 406 then performs the appropriate inventory collection, as described more fully below, and sends back an XML file that includes the data describing the assets on target server 110*a*. Thereafter, the discovery process 406 terminates and then is preferably shut down and also removed from target server 10*a*. The process is then repeated for the remaining servers in the server farm 110, e.g., 110*b*, 110*c*, and so on.

When the Application and System discovery agent starts on the target server 110*a*, the processes and DLLs information is collected using various system calls. To obtain a list of all processes in a Windows 2000 Server operating system environment, the following calls are used:

```
ULONG (___stdcall *NtQuerySystemInformation)(
                        ULONG SystemInformationClass,
                        PVOID SystemInformation,
                        ULONG SystemInformationLength,
                        PULONG ReturnLength
                        );
```

NtQuerySystemInformation is an internal Windows function that retrieves various kinds of system information.

SystemInformationClass indicates the kind of system information to be retrieved. The information includes: the number of processors in the system, information about the resource usage of each process, including the number of handles used by the process, the peak page-file usage, and the number of memory pages that the process has allocated.

SystemInformation points to a buffer where the requested information is to be returned. The size and structure of this information varies depending on the value of the SystemInformationClass parameter:

SystemInformationLength is the size of the buffer pointed to by the SystemInformation parameter, in bytes.

ReturnLength is an optional pointer to a location where the function writes the actual size of the information requested.

Another call is used that provides a starting address to obtain the information about what DLLs are loaded by a process. That call is as follows:

```
ULONG (___stdcall *NtQueryInformationProcess)(
                        PVOID ProcessHandle,
                        INT ProcessInformationClass,
                        PVOID ProcessInformation,
                        ULONG ProcessInformationLength,
                        PULONG ReturnLength );
```

ProcessHandle specifies the handle to the process for which information is to be retrieved.

ProcessInformationClass specifies the type of process information to be retrieved. This parameter can either retrieves a pointer to a PEB structure that can be used to determine whether the specified process is being debugged, and a unique value used by the system to identify the specified process or whether the process is running in the WOW64 environment (WOW64 is the x86 emulator that allows Win32-based applications to run on 64-bit Windows).

ProcessInformation is a Pointer to a buffer supplied by the calling application into which the function writes the requested information.

ProcessInformationLength is the size of the buffer pointed to by the ProcessInformation parameter, in bytes.

RetunLength is a pointer to a variable in which the function returns the size of the requested information.

The information so collected is then put into an XML file and transmitted back to consolidation computer system 117. The below XML provides an example of a portion of such an XML file.

```
<?xml version="1.0" encoding="ISO-8859-1" ?>
<Discovery type="Process">
<PE_SysInfo ID="5008DJUL1030-SI" discoverVersion="2.0.0"
captureTimeGMT="21:10:30 30 Oct 2003" captureTimeNumeric="1067548230"
systemName="USMV-MUTSCHGO" systemMake="Dell Computer Corporation"
systemModel="Dell WORKSTATION PWS360" osMajorVersion="5"
osMinorVersion="1" osBuild="2600" osRev="Service Pack 1" pageSize="4096"
allocationGranularity="65536" totalMemory="1072689152"
```

-continued

```
availableMemory="634216448" totalVirtualMemory="2147352576"
availableVirtualMemory="2111578112" totalPageFile="2581708800"
availablePageFile="2110324736" memoryLoad="40" cpuLoad="1.7"
systemDirectory="C:\WINDOWS\System32\">
  <PE_SysInfoEx ID="EI" parent_ID="5008DJUL1030-SI" servicePackMajor="1"
servicePackMinor="0" productType="PROD_WORKSTATION"
installedPkg="PKG_SINGLEUSERTS" />
<PE_HdweInfo ID="HI" parent_ID="5008DJUL1030-SI" numberOfProcessors="2"
availableProcessorMask="3" processorLevel="15" processorRevision="521">
  <PE_ProcessorSpeed parent_ID="HI" procNum="0" speed="2992" />
  <PE_ProcessorSpeed parent_ID="HI" procNum="1" speed="2992" />
<PE_Device parent_ID="HI" deviceLocation="LPT1" cmpLocation="">
  <deviceName>Printer Port Logical Interface</deviceName>
  </PE_Device>
<PE_Device parent_ID="HI" deviceLocation="USB Device" cmpLocation="">
  <deviceName>ViewSonic Color Pocket PC V37</deviceName>
  </PE_Device>
<PE_Device parent_ID="HI" deviceLocation="" cmpLocation="0,0,0,1">
  <deviceName>HL-DT-ST RW/DVD GCC-4480B</deviceName>
  </PE_Device>
...
<PE_AppCatalogItem parent_ID="5008DJUL1030-SI" appName="PowerDVD"
appVersion="" publisher="" msiGuid="{6811CAA0-BF12-11D4-9EA1-
0050BAE317E1}">
  <installLocation />
  <installSource />
  </PE_AppCatalogItem>
<PE_AppCatalogItem parent_ID="5008DJUL1030-SI" appName="Easy CD Creator 5
Basic" appVersion="5.3.4.21" publisher="Roxio Inc" msiGuid="{609F7AC8-C510-
11D4-A788-009027ABA5D0}">
  <installLocation />
  <installSource />
  </PE_AppCatalogItem>
<PE_AppCatalogItem parent_ID="5008DJUL1030-SI" appName="Microsoft Office
2000 SR-1 Premium" appVersion="9.00.9327" publisher="Microsoft Corporation"
msiGuid="{00000409-78E1-11D2-B60F-006097C998E7}">
  <installLocation />
  <installSource>\\usmv-sms\UITSoftware\STD2000.S2A\</installSource>
  </PE_AppCatalogItem>
<PE_AppCatalogItem parent_ID="5008DJUL1030-SI" appName="Microsoft SQL
Server 2000" appVersion="8.00.761" publisher="Microsoft" msiGuid="">
  <installLocation>C:\Program Files\Microsoft SQL Server\MSSQL</installLocation>
  <installSource />
  </PE_AppCatalogItem>
...
<PE_Process ID="Proc.1588" parentSystem_ID="5008DJUL1030-SI"
processName="AGENTSRV.EXE" processId="1588" depth="5" affinityMask="3"
processOwner="NT AUTHORITY\SYSTEM" parentProcess_ID="Proc.772"
startTime="09:21:25 29 Oct 2003" startTimeNumeric="1067448085"
handleCount="119" basePriority="8" cpuTime="1441406250"
percentCpuTime="0.1" hasServices="true" ownProcess="false"
peakVirtualSize="187858944" pageFaultCount="127666"
peakWorkingSetSize="107339776" workingSetSize="184320"
quotaPeakPagedPoolUsage="51872" quotaPagedPoolUsage="50056"
quotaPeakNonPagedPoolUsage="20446" quotaNonPagedPoolUsage="4400"
pagefileUsage="18952192" peakPagefileUsage="107180032"
privatePageCount="18952192" version="7.0.3.0892" usedModules="Mod.0 Mod.1
Mod.2 Mod.3 Mod.4 Mod.5 Mod.6 Mod.7 Mod.8 Mod.9 Mod.10 Mod.11 Mod.12
Mod.13 Mod.14 Mod.15 Mod.16 Mod.17 Mod.18 Mod.19 Mod.20 Mod.21 Mod.22
Mod.23 Mod.24 Mod.25 Mod.26 Mod.27 Mod.28 Mod.29 Mod.30">
  <description>Agent Service Module</description>
  <fullPath>C:\Legato Connected\AGENTSRV.EXE</fullPath>
  <commandLine>"c:\Legato Connected\AgentSrv.EXE" -asv</commandLine>
  </PE_Process>
<PE_Process ID="Proc.772" parentSystem_ID="5008DJUL1030-SI"
processName="SERVICES.EXE" processId="772" depth="4" affinityMask="3"
processOwner="NT AUTHORITY\SYSTEM" parentProcess_ID="Proc.728"
startTime="09:21:21 29 Oct 2003" startTimeNumeric="1067448081"
handleCount="365" basePriority="9" cpuTime="79843750" percentCpuTime="0.0"
hasServices="true" ownProcess="false" peakVirtualSize="54595584"
pageFaultCount="4985" peakWorkingSetSize="7499776"
workingSetSize="4673536" quotaPeakPagedPoolUsage="58560"
quotaPagedPoolUsage="35612" quotaPeakNonPagedPoolUsage="14264"
quotaNonPagedPoolUsage="11040" pagefileUsage="3964928"
peakPagefileUsage="4517888" privatePageCount="3964928" version="5.1.2600.0
(xpclient.010817-1148)" usedModules="Mod.217 Mod.1 Mod.2 Mod.9 Mod.5 Mod.6
Mod.3 Mod.4 Mod.66 Mod.218 Mod.212 Mod.219 Mod.84 Mod.220 Mod.73 Mod.221
Mod.17 Mod.18 Mod.50 Mod.37 Mod.89 Mod.65 Mod.19 Mod.222 Mod.30 Mod.223
Mod.7 Mod.42">
```

```
<description>Services and Controller app</description>
<fullPath>C:\WINDOWS\SYSTEM32\SERVICES.EXE</fullPath>
<commandLine>C:\WINDOWS\system32\services.exe</commandLine>
</PE_Process>
...
<PE_Module version="1.02.0814.0000" ID="Mod.392" parent_ID="5008DJUL1030-
SI" base="1505034240" size="36864" memoryMapped="false"
creationTime="8/29/2002 2:00 AM">
  <moduleDescription>WinInet Soap Connector Library</moduleDescription>
  <path>C:\Program Files\Common Files\MSSoap\Binaries\WISC10.DLL</path>
  <imageName>WISC10.DLL</imageName>
</PE_Module>
...
</PE_SysInfo>
</Discovery>
```

When the SQL Server discovery agent starts on the target server 110a, the following actions are performed:

1. The agent captures the SQL Server name and version on the target machine 110a.
2. For each instance of the SQL Server on target machine 110a, the following information is captured:

The database schema's present is determined, and for each database schema information is collected such as tables, views, indexes, roles, etc.

User logins, permissions and roles

User objects in the master db

Database names and logins and database client names

SQL configuration settings

Collation settings

Jobs and tasks

SQL alerts

Replication

DTS packages list

Database size and log size information

In general, the captured data is used to detect differences between database objects for duplicate databases on multiple servers. The following database objects are captured for comparison:

Roles, Users, Aliases, Defaults, Rules, Functions, User defined data types, User messages, Tables, Views, Indexes, Extended procedures, Stored procedures and Triggers. There are several methods available to capture this information. The preferred method uses T-SQL and collects the catalogue information from system tables. The below description illustrates an implementation for SQL Server available from Microsoft Corporation. Nevertheless, the overall technique is also applicable to other database systems such as Oracle database systems.

SQL Server available system stored procedures are used to capture information. For example, a join query against Sysprocesses and sysdatabases tables captures some of the information as follows:

```
SELECT dbs.[name], [program_name],[loginame] FROM
[master].[dbo].[sysprocesses] procs, [master].[dbo].[sysdatabases] dbs
Where procs.[dbid] = dbs.[dbid] And Len([program_name]) > 0
```

The function interrogates Master db for any user objects. System Stored procedures are used to capture the data. The function looks for user type objects in the master database and the ones found along with their description and contents is written to XML file to be stored in the cache database.

```
SELECT    CONVERT(char(32), host_name( )) as
MachineName, ServerName = CASE @@servername WHEN null
THEN CONVERT(char(32), host_name( )) ELSE CONVERT(char(32),
@@servername) END, o.name as StoredProcName, u.name as
OwnerName FROM master..sysobjects o, master..sysusers u    WHERE
o.uid = u.uid and o.type = 'P' and o.category = 0 and
o.name < > 'sp_helpsql'
```

To identify the potential login problems like duplicate names in more than one server and the conflicting permission, this function captures the logins and permissions via the stored procedures available.

For each instance get the list of logins and their roles for each database within that instance.

The configuration information such as from sp_configure, is extracted and compared against the default settings for a particular version of SQL Server.

SQL Server function ServerProperty is used to collect product version, edition, service pack, collation, etc. as illustrated below:

```
Select CONVERT(char(32), serverproperty('Collation') )as 'Collation',
CONVERT(char(32), serverproperty('Edition'))as 'Edition',
CONVERT(char(32), serverproperty('Engine Edition') )as
'Engine Edition',
CONVERT(char(32), serverproperty('InstanceName') )as 'InstanceName',
CONVERT(char(32), serverproperty('IsClustered'))as 'IsClustered',
CONVERT(char(32), serverproperty('IsFullTextInstalled'))as
'IsFullTextInstalled',
CONVERT(char(32), serverproperty('IsIntegratedSecurityOnly'))as
'IsIntegratedSecurityOnly',
CONVERT(char(32), serverproperty('IsSingleUser'))as 'IsSingleUser',
CONVERT(char(32), serverproperty('IsSyncWithBackup'))as
'IsSyncWithBackup',
CONVERT(char(32), serverproperty('LicenseType'))as 'LicenseType',
CONVERT(char(32), serverproperty('MachineName'))as 'MachineName',
CONVERT(char(32), serverproperty('NumLicenses'))as 'NumLicenses',
CONVERT(char(32), serverproperty('ProcessID'))as 'ProcessID',
CONVERT(char(32), serverproperty('ProductVersion'))as
'ProductVersion',
CONVERT(char(32), serverproperty('ProductLevel'))as 'ProductLevel',
CONVERT(char(32), serverproperty('ServerName'))as 'ServerName'
For non-2000 SQL Server some of these fields will be null.
```

The below functions captures lists of Jobs, via sysjobs table of msdb, Alerts via sysAlerts table and Operators via sysOperators for an Instance.

```
Jobs:
Select CONVERT(char(32), host_name( )) as MachineName, ServerName = CASE
@@servername WHEN null THEN CONVERT(char(32), host_name( )) ELSE
CONVERT(char(32), @@servername) END,* from msdb..sysjobs
Alerts:
SELECT CONVERT(char(32), host_name( )) as MachineName, ServerName = CASE
@@servername WHEN null THEN CONVERT(char(32), host_name( )) ELSE
CONVERT(char(32), @@servername) END,[id],[Name],Event_source,
Event_category_id, Event_id, Message_id, Severity,
Enabled,Delay_between_responses, Last_occurrence_date, Last_occurrence_time,
Last_response_date, Last_response_time, Notification_message,
Include_event_description, Database_name, Event_description_keyword,
Occurrence_count, Count_reset_date, Count_reset_time, Job_id, Has_notification,
Flags, Performance_condition, Category_id, " as Event_category_name, " as
Delay_between_notifications, " as Task_id, " as Has_email_notification, " as
Has_pager_notification FROM msdb..sysalerts
Operators:
DECLARE @SQLVersion varchar(4)
SELECT @SQLVersion = SUBSTRING(@@version, 23, 4)
--Extract the information, dependant on SQL version
IF (@SQLVersion = '6.50')
    SELECT CONVERT(char(32), host_name( )) as MachineName, ServerName =
CASE @@servername WHEN null THEN CONVERT(char(32), host_name( )) ELSE
CONVERT(char(32), @@servername) END,*, " as Netsend_address, " as
Last_netsend_date, " as Last_netsend_time, " as Category_id FROM
msdb..sysoperators
ELSE
    IF (@SQLVersion = '7.00') or (@SQLVersion = '2000')
        SELECT CONVERT(char(32), host_name( )) as MachineName,
ServerName = CASE @@servername WHEN null THEN CONVERT(char(32),
host_name( )) ELSE CONVERT(char(32), @@servername) END,* FROM
msdb..sysoperators
```

Where replication is allowed, information is collected on databases and reported in a list, server, instance and dbnames along with replication role (Publisher, Distributor, Subscriber) and replication type. The system Store procedure 'sp_helpreplicationdboption' is utilized to capture replication information. To capture DTS packages info, the following SQL statements are exercised:

```
DECLARE @SQLVersion varchar(4)
DECLARE @SQLString varchar(255)
SELECT @sqlversion = SUBSTRING(@@version, 23, 4)
IF (@SQLVersion = '6.50')
    select ' '
ELSE
    IF (@SQLVersion = '7.00')
        IF @@ServerName is not Null
            SELECT @SQLString = 'SELECT CONVERT(char(32),
host_name( )) as MachineName, CONVERT(char(32), @@servername) as
ServerName,name,id,versionid,cast(description AS char(25)) as ShortDescription,
categoryid,createdate,owner, owner_sid, "" as PackageType from
msdb..sysdtspackages'
        ELSE
            SELECT @SQLString = 'SELECT CONVERT(char(32),
host_name( )) as MachineName, CONVERT(char(32), host_name( )) as
ServerName,name,id,versionid,cast(description AS char(25)) as ShortDescription,
categoryid,createdate,owner, owner_sid, "" as PackageType from
msdb..sysdtspackages'
    ELSE
        IF @SQLVersion = '2000'
            IF @@ServerName is not Null
                SELECT @SQLString = 'SELECT CONVERT(char(32),
host_name( )) as MachineName, CONVERT(char(32), @@servername) as
ServerName,name,id,versionid,cast(description AS char(25)) as ShortDescription,
categoryid,createdate,owner, owner_sid,packagetype from msdb..sysdtspackages'
            ElSE
                SELECT @SQLString = 'SELECT CONVERT(char(32),
host_name( )) as MachineName, CONVERT(char(32), host_name( )) as
ServerName,name,id,versionid,cast(description AS char(25)) as ShortDescription,
categoryid,createdate,owner, owner_sid,packagetype from msdb..sysdtspackages'
EXEC(@SQLString)
```

In order to get the database size and log size for each database dbsize (used and free), and logsize (used and free) are used and reported with server/instance/dbname. The below is sample code to go to each database and execute stored procedure 'sp_spaceused' to capture some of the information.

```
DECLARE AllDatabases CURSOR FOR SELECT name FROM
sysdatabases --WHERE dbid > 4
OPEN AllDatabases
DECLARE @DBNameVar VARCHAR(128)
DECLARE @Statement VARCHAR(255)
FETCH NEXT FROM AllDatabases INTO @DBNameVar
WHILE (@@FETCH_STATUS = 0)
BEGIN
    SELECT @Statement = 'USE' + @DBNameVar + CHAR(13)
        + ' exec sp_spaceused'
    EXEC (@Statement)
    FETCH NEXT FROM AllDatabases INTO @DBNameVar
END
CLOSE AllDatabases
DEALLOCATE AllDatabases
```

To capture log size information, the following SQL statement is used: DBCC SQLPERF(LOGSPACE) WITH NO_INFOMSGS The database information captured is formatted into an XML file and transmitted back to the consolidation system 117. An example portion of such and XML file is as follows:

Here is a more detailed XML layout for the Schema information part only.

For each database within an SQL instance, there is an element called <SchemaInfo> containing the information.

```
<SchemaInfo
  <TableInfo
    <ColumnInfo name = "columnName goes here"
        Description = "column description goes here" />
    <ColumnInfo name = "columnName goes here"
        Description = "column description goes here" />
    <ColumnInfo name = "columnName goes here"
        Description = "column description goes here" />
    .......
    ....... more columns
    <TriggerInfo name = "triggerName " Description = " trigger
    description" />
    .......
    .......additional triggers
    <ConstraintInfo name = "constraintName "
        Description = "constraint description" />
    .......
    .......additional constraints
    <IndexInfo name = "indexName " Description = "index
    description" />
    .......
    .......additional indexes
  </TableInfo>
..........
..........additional tables go here
<ViewInfo name = "viewName goes here"
    Description = "view description goes here" </ViewInfo>
```

```
<?xml version="1.0" encoding="ISO-8859-1" ?>
<Discovery type="Database">
<DD_Server machineName="USMV-VAZEHGMM1" windowsVersion="5.1.2600
Service Pack 1 Build 2600" discoverVersion="2.0.0" processorCount="1"
processorActiveMask="" OS_Name="Windows_NT 5" systemName="USMV-
VAZEHGMM1" systemManufacturer="Dell Computer Corporation" systemModel="Dell
OPTIPLEX GX260" systemType="x86" processor="x86 Family 15 Model 2 Stepping 4
GenuineIntel ~ 2000 MHz" BIOSVersion="DELL - 6" locale="United States"
timeZone="Pacific Standard Time" windowsDirectory="C:\WINDOWS"
bootDevice="\Device\HarddiskVolume3" systemDirectory="C:\WINDOWS\System32"
physicalMemory="1046524.00" availablePhysicalMemory="102700.00"
virtualMemory="2097024.00" availableVirtualMemory="2040440.00"
pagefileSpace="0.00">
 ...
<DD_Database serverName="USMV-VAZEHGMM1\DESKTOPSERVER"
dbName="Analysis"owner="sa" created="Sep 3 2003" status="Status=ONLINE,
Updateability=READ_WRITE, UserAccess=MULTI_USER, Recovery=SIMPLE,
Version=539, Collation=SQL_Latin1_General_CP1_CI_AS, SQLSortOrder=52,
IsAutoClose, IsAutoShrink, IsTornPageDetectionEnabled, IsAutoCreateStatistics,
IsAutoUpdateStatistics" compatibility_level="80" logSize="0.00"
logspaceUsed="0.00" lStatus="" dbSize="24.06" unalloc_s="1.91"
reserv_s="21664.00" data_s="15552.00" Index_s="5736.00" unused_sp="376.00"
transPublish="0" mergePublish="0" dbOwner="True" readOnly="False">
<DD_SchemaInfo>
<DD_Table serverName="USMV-VAZEHGMM1\DESKTOPSERVER"
dbName="Analysis" tableName="DD_Alert">
 <DD_Column serverName="USMV-VAZEHGMM1\DESKTOPSERVER"
dbName="Analysis" tableName="DD_Alert" ColumnName="fileVersion"colid="1"
coltype="nvarchar" collen="510" colprec="255" colscale="0" isnullable="0"
collation="SQL_Latin1_General_CP1_CI_AS" />
  </DD_Table>
  <DD_User serverName="USMV-VAZEHGMM1\DESKTOPSERVER"
dbName="Analysis" loginName="" groupName="" userName="guest" />
  </DD_SchemaInfo>
  </DD_Database>
  </DD_Instance>
  </DD_Server>
  </Discovery>
```

-continued

```
  ....... more views
  <UdtInfo name = "UDTName goes here"
       Description = "UDT description " </UdtInfo>
  .......
  ........ more user-defined types
  <FunctionInfo name = "functionName goes here"
         Description = "function description goes here" </FunctionInfo>
  ........
  ......... more user-defined functions
  <SPInfo name = "stored-procedureName goes here"
     Description = "Stored-procedure description goes here" </SPInfo>
  ........
  ......... more user stored-defined procs
  <DefaultsInfo name = "defaultName goes here"
       Description = "default description goes here" </DefaultInfo>
  .........
  ......... more defaults in here
  <RuleInfo name = "ruleName goes here"
     Description = "rule description goes here" </RuleInfo>
  ........
  ......... more rules in here
  <UserInfo name = "userName goes here"
       Description = "user description goes here" </UserInfo>
  ........
  ......... more user info in here
  <UserMsgInfo name = "userMsgName goes here"
       Description = "userMsg description goes here" </UserMsgInfo>
  ........
  ......... more user messages info in here
</SchemaInfo>
```

After the information for a particular server has been discovered, the process is repeated for another server, e.g., 110b, until all of the servers of interest in a server farm, e.g., 110, have been discovered. After a sufficient number of the servers has been discovered, and more likely after a substantial number of the servers have been discovered, the analysis tools can be used to assist in aspects of the consolidation process.

Analysis tools interpret and generate reports from the information obtained during the discovery process. Any of the discovery files can be opened, including revisions of each file. Thus, the analysis process can be tailored to focus on any subset of discovered server assets. Once the set of discovery files are opened, the analysis tools summarizes the number of systems and processes being analyzed.

Although the analysis is described herein below in the context of server consolidation wherein the applications, databases, etc. are move to one or more other target servers, the analysis aspects and indeed many of the tools described herein also apply to a single server. That is, aspects of a server can be compared to itself at different points in time. Hence, it is important to note that the discovered XML files described above are maintained by server by time. This allows two forms of time-based analysis. In one case, the processes in use and system loading for a server can be examined as they change over time. In the other case, a server can be compared to itself after consolidation activities have occurred. That will allow a consolidation to be rolled back. For instance, if an application and its dependencies were moved from a source server to a consolidation target server and the application and some or all of its dependencies were subsequently removed from the source server, the analysis tools described herein will allow all of the features to be applied in comparing one version of a server's inventory to a different version of the same server's inventory. In that way, a user can revert back to an early system state. Similarly, the system could be used to track what inventory was added to a particular server and at what version the additions were made. In this way, the analysis tool may allow a user to quickly identify which applications were added to a server that may have caused it to exceed utilization criteria. The important point is that the tools described herein apply to other contexts than the context of comparing a source server to a target server for the purpose of consolidation.

Reports that highlight opportunities for application consolidation and application coexistence can be generated. For example, the Common Processes report lists the processes running on two or more systems within the server farm. Applications associated with common processes are consolidation candidates. The analysis tools provide custom report output, sorted in any manner, on any stored attribute.

Figure 5:
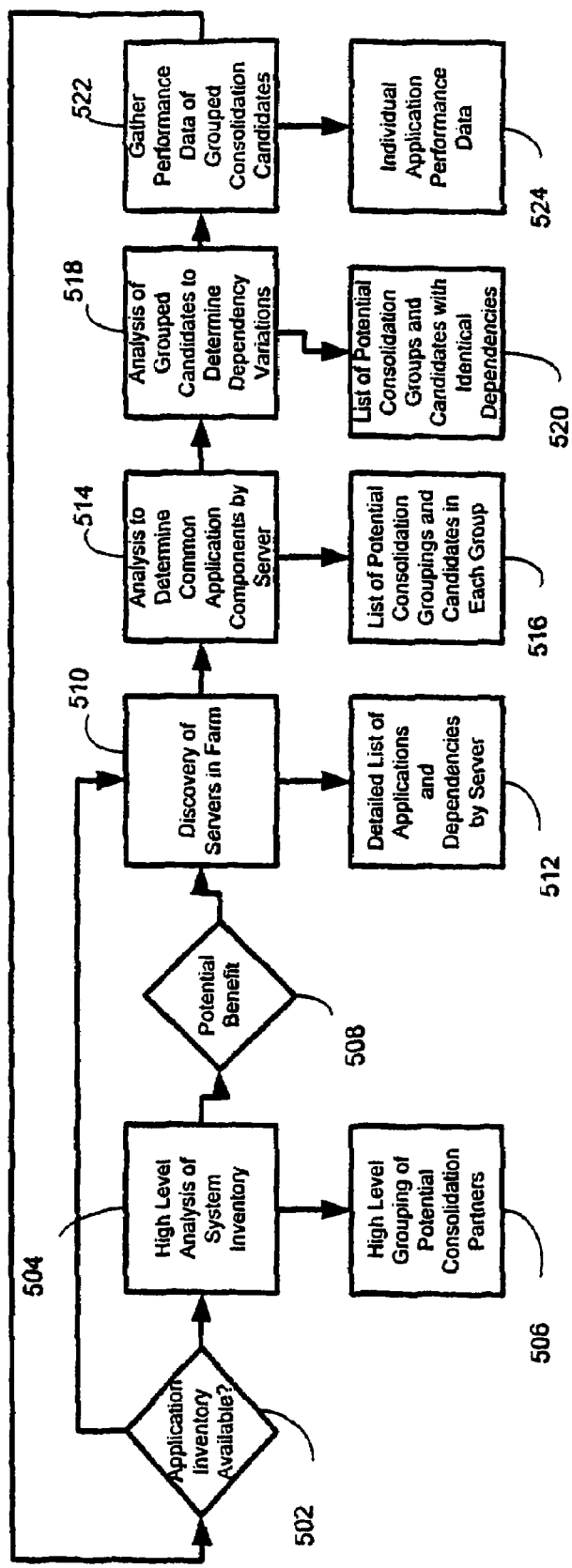
FIG. 5 is a high level flow diagram that illustrates the overall server consolidation.

Reports can be generated based on queries of any of the following data elements:
Hardware Information
Number of processors on a given system
Available processors on a given system
Processor level and revision
Devices on a PCI bus
Non-network disk drives on a system and characteristics of the drives
System Information
System name
Operating system version
Operating system build
Total and available memory
Applications
Application name
Application version
Processes
Process name and process ID
Process owner
Process dependencies
Process and dependency descriptions
Process and dependency versions and timestamps
Actual memory and virtual memory
Memory paging
Processor usage
Actual CPU time
Number of handles open on a process FIG. 5 provides a flow chart of the general process involved in analyzing the collected data for the purpose of consolidation. The figure uses the example of application consolidation. Nevertheless, a very similar process will happen for data consolidation. Obviously, if all of the applications and data on a given server are consolidated to other servers, that server is a candidate for removal from the server far altogether, resulting in a physical consolidation.

Initially, a determination is made whether data has been discovered for a server or servers of interest (step 502). An initial high level analysis is made to determine potential consolidation candidate servers (step 504, 506). This process is described more fully below in connection with the analysis user interface figures. At step 508, a determination is made regarding the potential benefit of a consolidation. If there is a potential benefit, then all of the necessary data for consolidation is collected (step 510). This may already have happened, if so that step can be skipped. However, all of the detailed information necessary for consolidation should be available such as an application and all of its dependent modules, or a database and all of its tables and columns (step 512). Thereafter, an analysis is performed to determine the common components on the candidate servers, e.g., the number of applications and modules that are common between the candidate servers. Next a list of potential consolidation groupings are made, e.g., the e-mail applications can be grouped together on one machine (steps 514, 516). After the candidate applications and/or databases are identified, the dependencies are compared for variations, e.g., is the DLL on one candidate server the same version as a DLL on the other server (steps 518, 520). After the applications and/or databases have been consolidated, performance values of the consolidated server are measured to ensure that it has the capacity to perform the added tasks (steps 522, 525). Thereafter, the entire process can be repeated and new information discovered for the consolidated server farm to determine whether further consolidation is beneficial.

Figure 6:
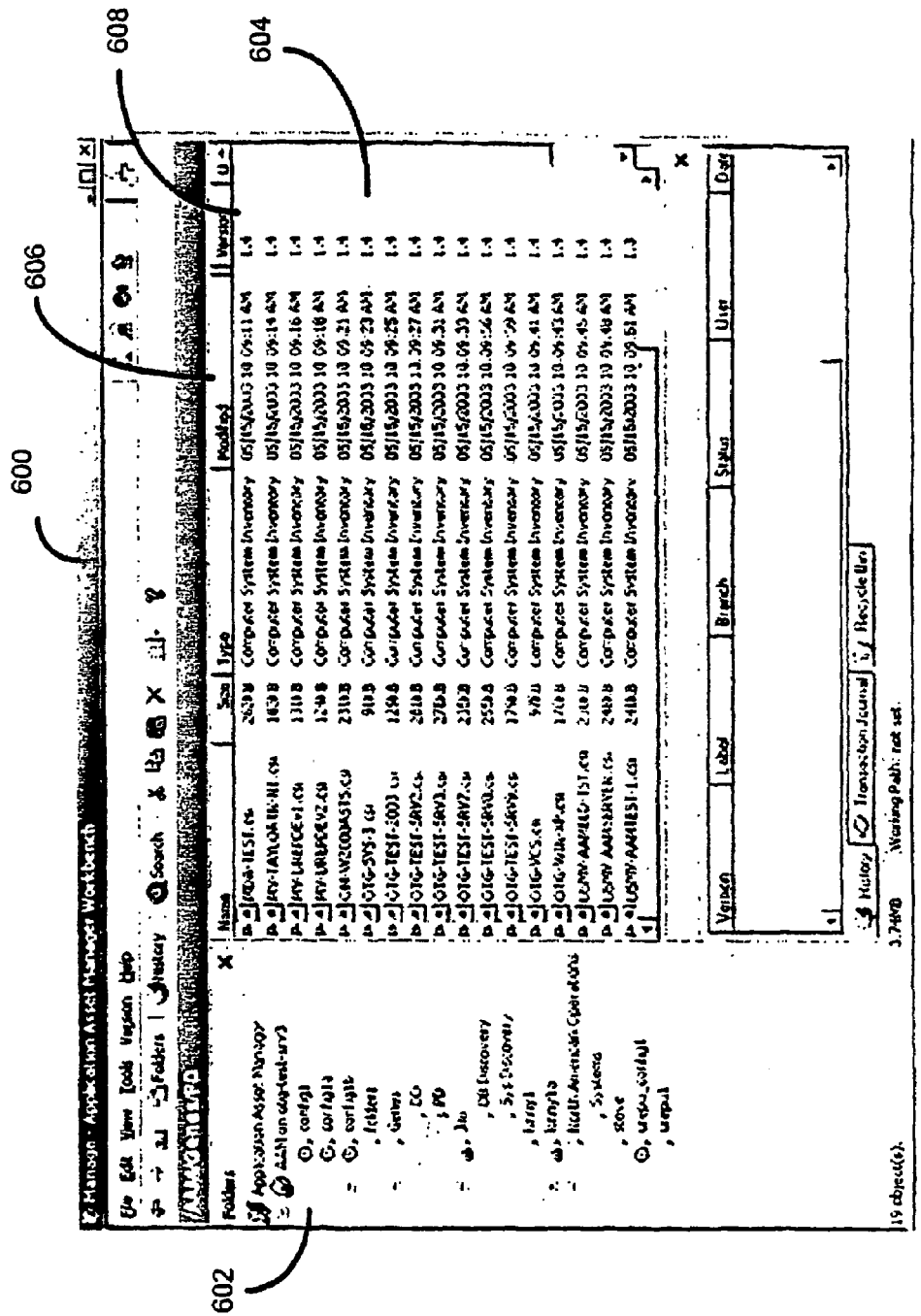
FIG. 6 is an exemplary user interface showing a hierarchical folder view of discovered server information.

FIG. 6 provides an illustration of an exemplary user interface (UI) for use in consolidation analysis. Window 600 provides an interface for users to browse through the various files of discovery information collected from the servers in the server farm of interest, e.g., 110. To that end Window 600 has a pane 602 with a hierarchically arranged catalog of server information arranged into folders. By selecting one of the folders, displayed in pane 602, the user is presented in pane 604 with a catalog of the XML files (described above) that have been collected from the various servers. Notably, each of the XML files contains a time stamp 606 and version number 608. That allows information to be discovered on the same server at different times and to monitor server changes.

Figure 7:
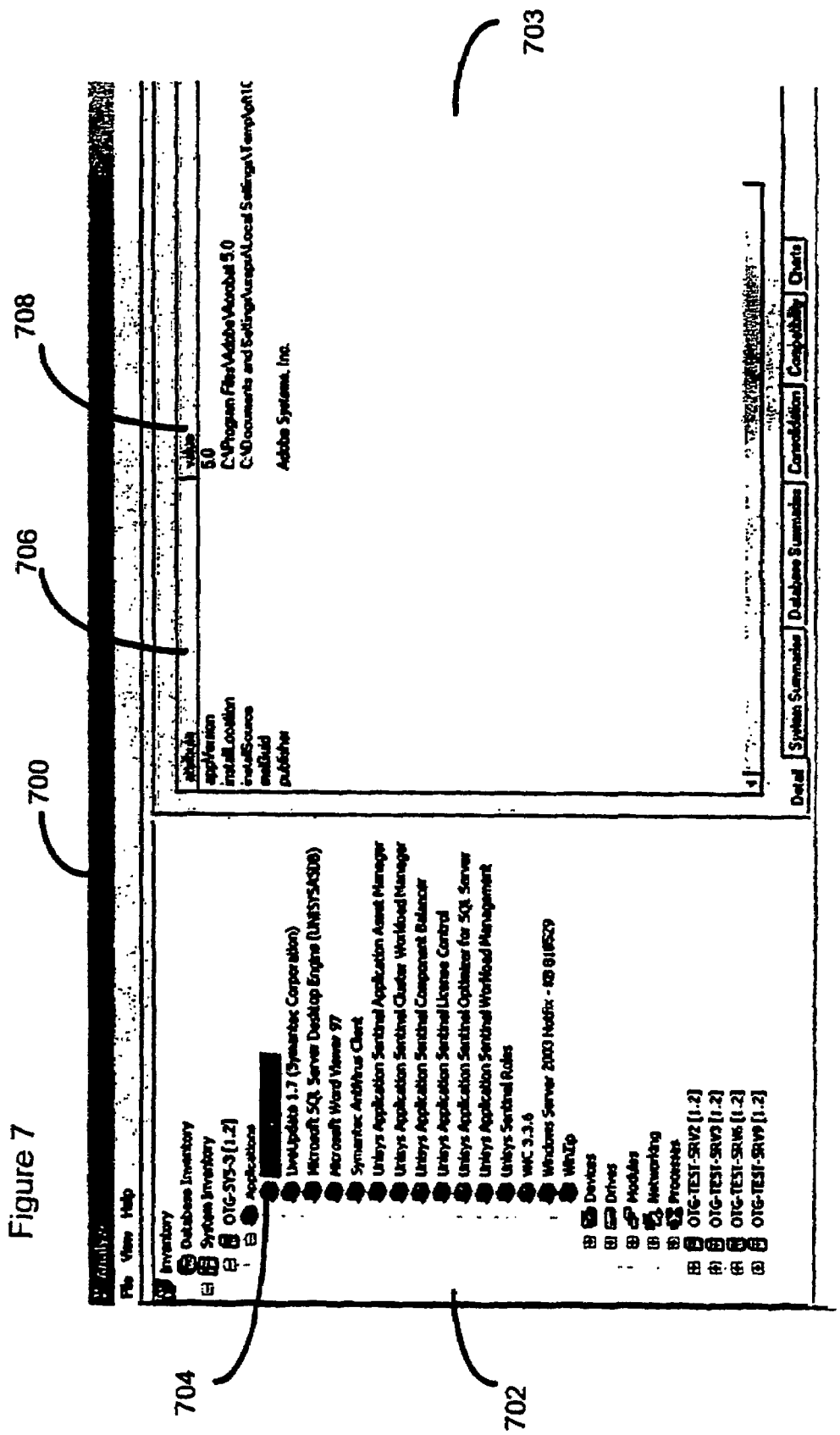
FIG. 7 is an exemplary user interface for displaying details of an application discovered on a server.

FIG. 7 depicts an example of a portion of the UI that assists in the analysis of server consolidation by allowing a user to view all of the inventory of discovered servers. Window 700 is divided into two panes 702 and 703. Pane 702 provides a hierarchical view of the discovered information for a server. Here for example, a user has opened a hierarchical view of the system inventory for server OTG-SYS-3 and has selected Applications and Adobe Acrobat 5.0 (704) in particular. The attributes 706 and corresponding values 708 for that application are displayed in pane 703.

Figure 8:
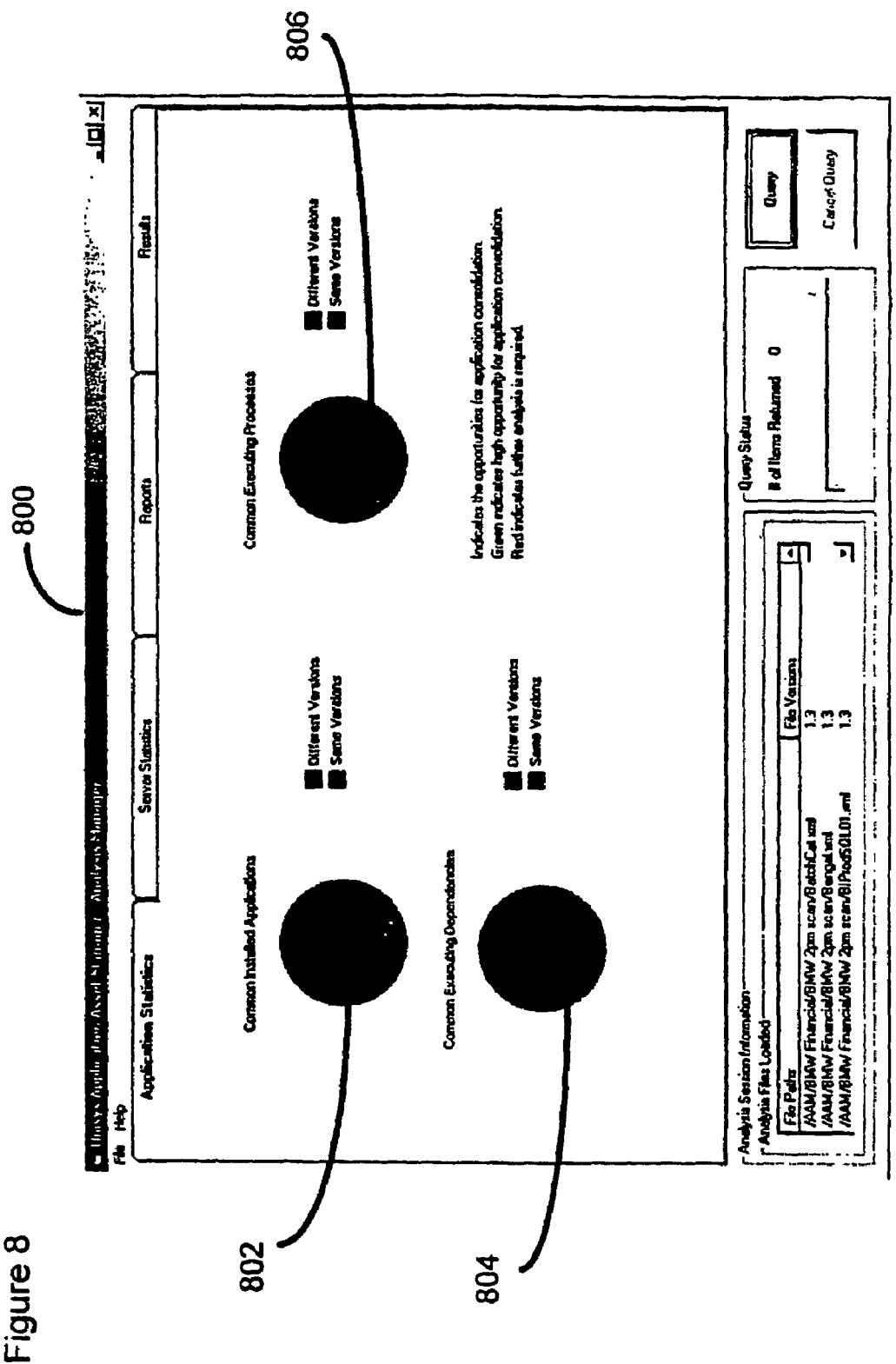
FIG. 8 is an exemplary user interface the assists in the analysis of determining commonality and differences among servers in a server farm.

FIG. 8 depicts an example of a portion of the UI that assists in the analysis of server consolidation by presenting a graphic of the commonality of applications on selected servers. Window 800 provides a view of three pie charts 802, 804, and 806. Pie chart 802 graphically depicts the applications that appear on more than one server with those applications that have different and the same versions appearing in different colors or shading. Here for example, pie chart 802 shows that there is a very high commonality of applications on selected servers, suggesting that benefits may be gained through consolidation. Similarly, pie chart 806 indicates the amount of commonality of process and shows a high commonality in this example. Pie chart 804 provides a graphic depiction of the commonality of process dependencies in the servers of interest. The details of the commonality can be viewed in more detail as shown in FIG. 9.

Figure 9:
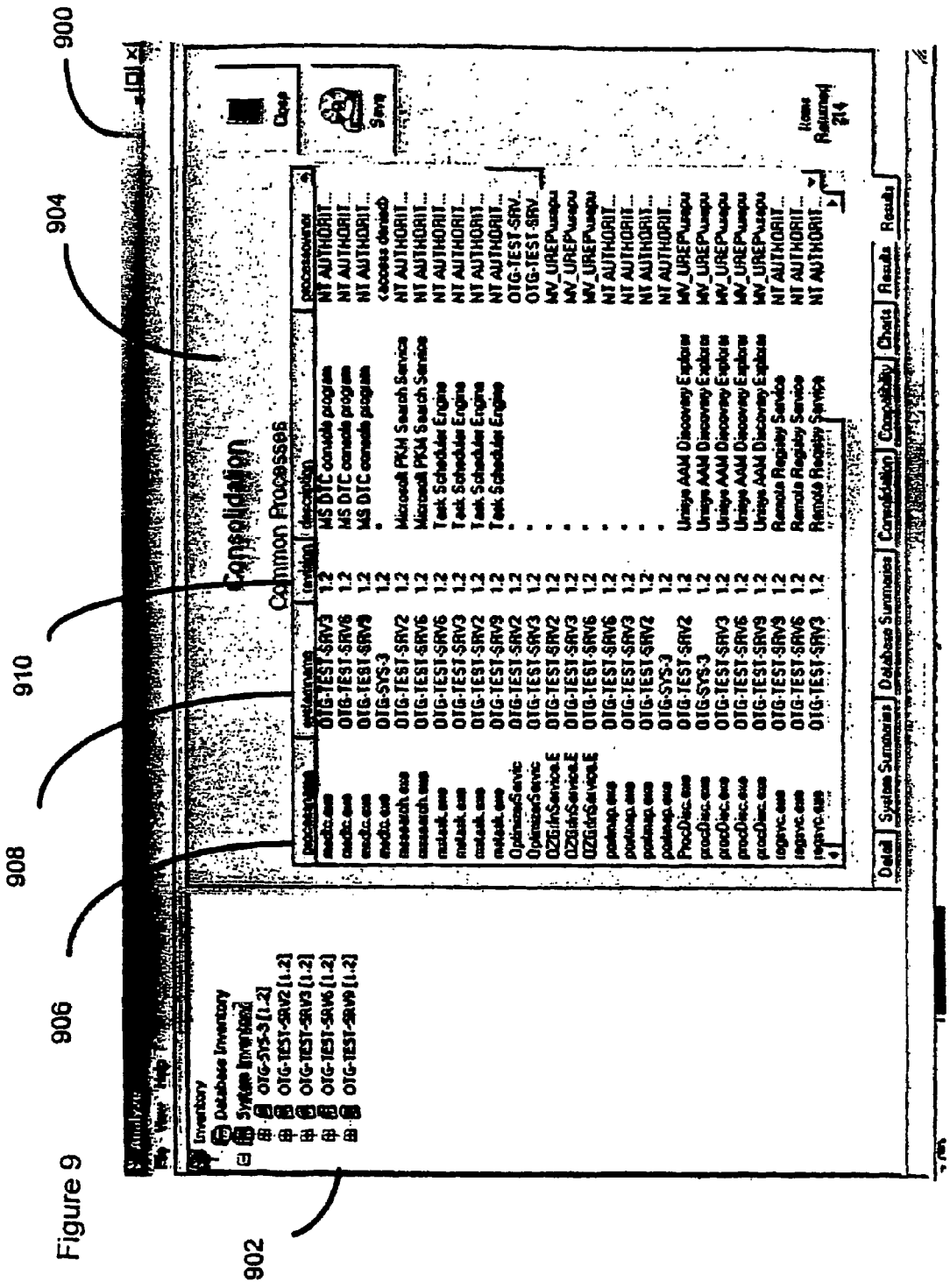
FIG. 9 is an exemplary user interface that provides further analysis detail on application commonality among servers.

FIG. 9 provides an example portion of the "UI" that provides further details on process commonality. Window 900 is divided into two panes 902 and 904. Pane 902 provides a listing of the servers in the server farm to undergo consolidation analysis, e.g., server farm 110. Pane 904 provides a list of processes by process name 906. Pane 904 also shows which server the process 908 is on, along with the discovery information revision 910. From this window 900, a user can further analyze candidate servers for consolidation by determining which servers are running key processes in common.

Figure 10:
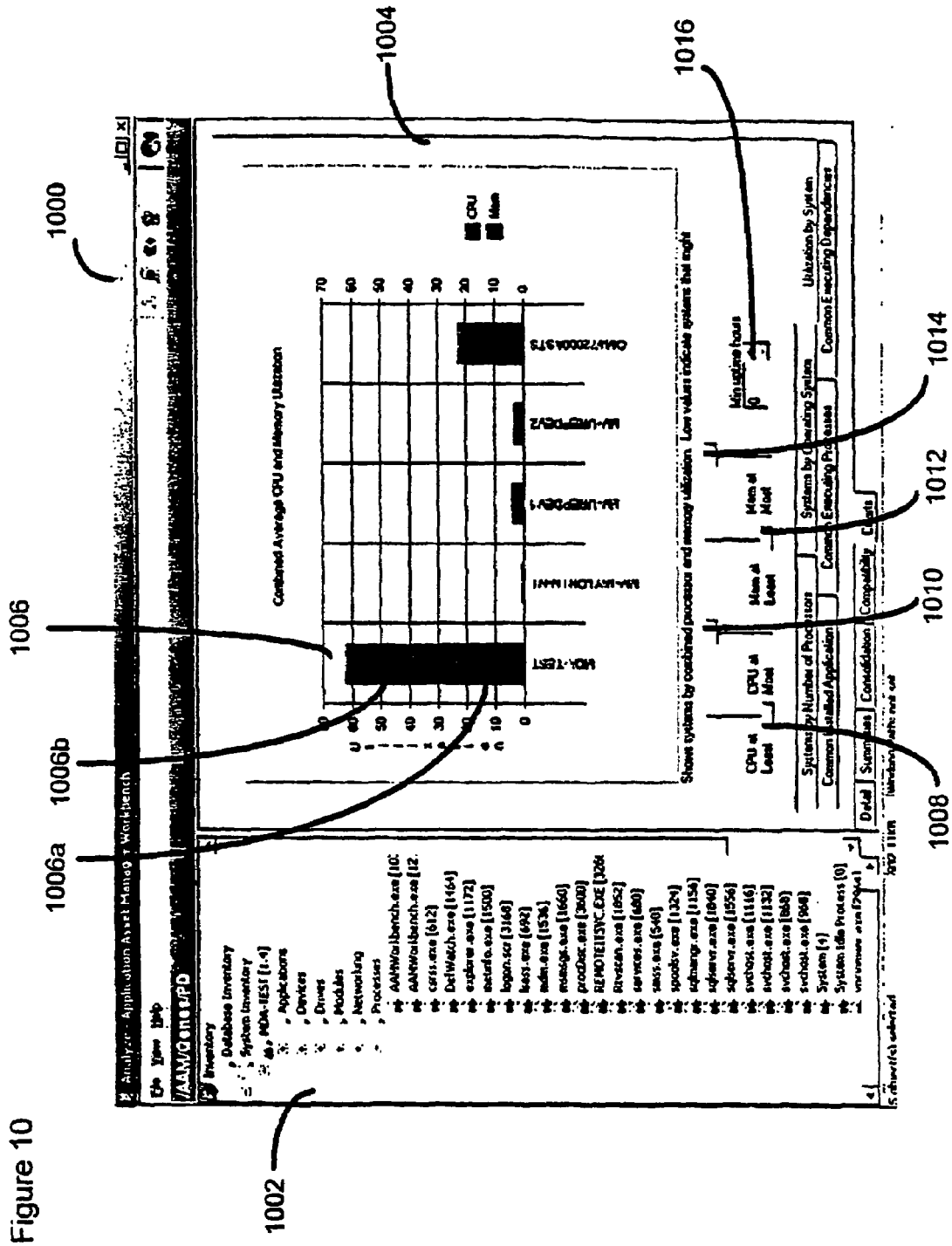
FIG. 10 is an exemplary user interface for viewing servers by CPU utilization and memory constraints.

Additional analysis functions provide an indication of memory and processor loads and assist in identifying servers that are underloaded or overloaded. Servers that are underloaded may be candidates to have their applications consolidated on to another server. Additionally, servers that are already overloaded are not good candidates to accept additional applications in a consolidation and may, in fact, benefit from have one or more of its applications moved to another server. FIG. 10 provides an example UI to display CPU and memory utilization. Window 1000 has two panes 1002 and 1004. Pane 1002 provides a hierarchical listing of server inventory. Pane 1004 provides a display showing the combined average CPU and memory utilization for servers in the system and help with compatibility analysis. Bar 1006 provides a graphic indication of the CPU and memory load on a particular server and has a portion 1006a that indicates CPU load and a portion 1006b that indicates memory load. Slides 1008 and 1010 provide a mechanism by which a user can filter the results, i.e., by setting the slide 1008 a user can exclude those systems from the display whose minimum CPU utilization is less than the threshold set by the slider and by setting the slide 1010 a user can exclude those systems whose CPU utilization exceed the maximum CPU utilization threshold set by the slider. Similarly, slides 1012 and 1014 allow a user to filter on memory utilization by setting the minimum and maximum thresholds. The filter allows a user to quickly identify source servers that are candidates for consolidation. The Min uptime hours spin box 1016 can be changed to exclude those systems from the display whose time of operation since the last restart is less than the number of hours indicated.

Figure 11:
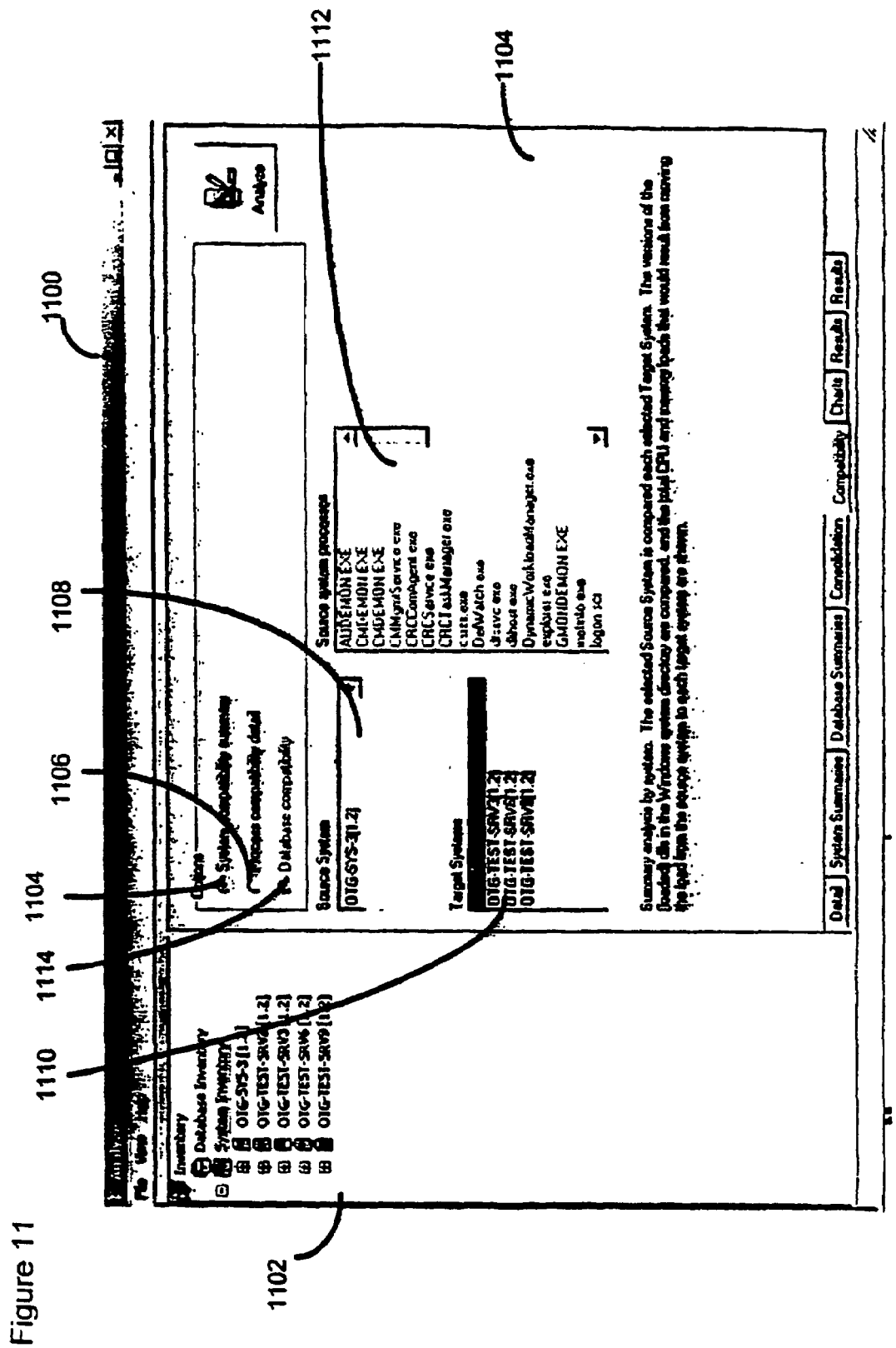
FIG. 11 is an exemplary user interface for selecting source and target systems for consolidation analysis.

FIG. 11 provides further details on the analysis tools provided for server consolidation. Here Window 1110 provides two panes 1102 and 1104. Pane 1102 lists all of the servers in the server farm, e.g., 110 that have been discovered by the System and Application discovery tool. Pane 1104 provides a mechanism for a user to select process or system compatibility by way of radio buttons 1104 and 1106. In this example, the user has selected system compatibility analysis. Thereafter, a use can select a source system 1108, e.g., a server candidate for consolidation and one or more target systems 1110. Source system processes are display in box 1112.

Figure 12:
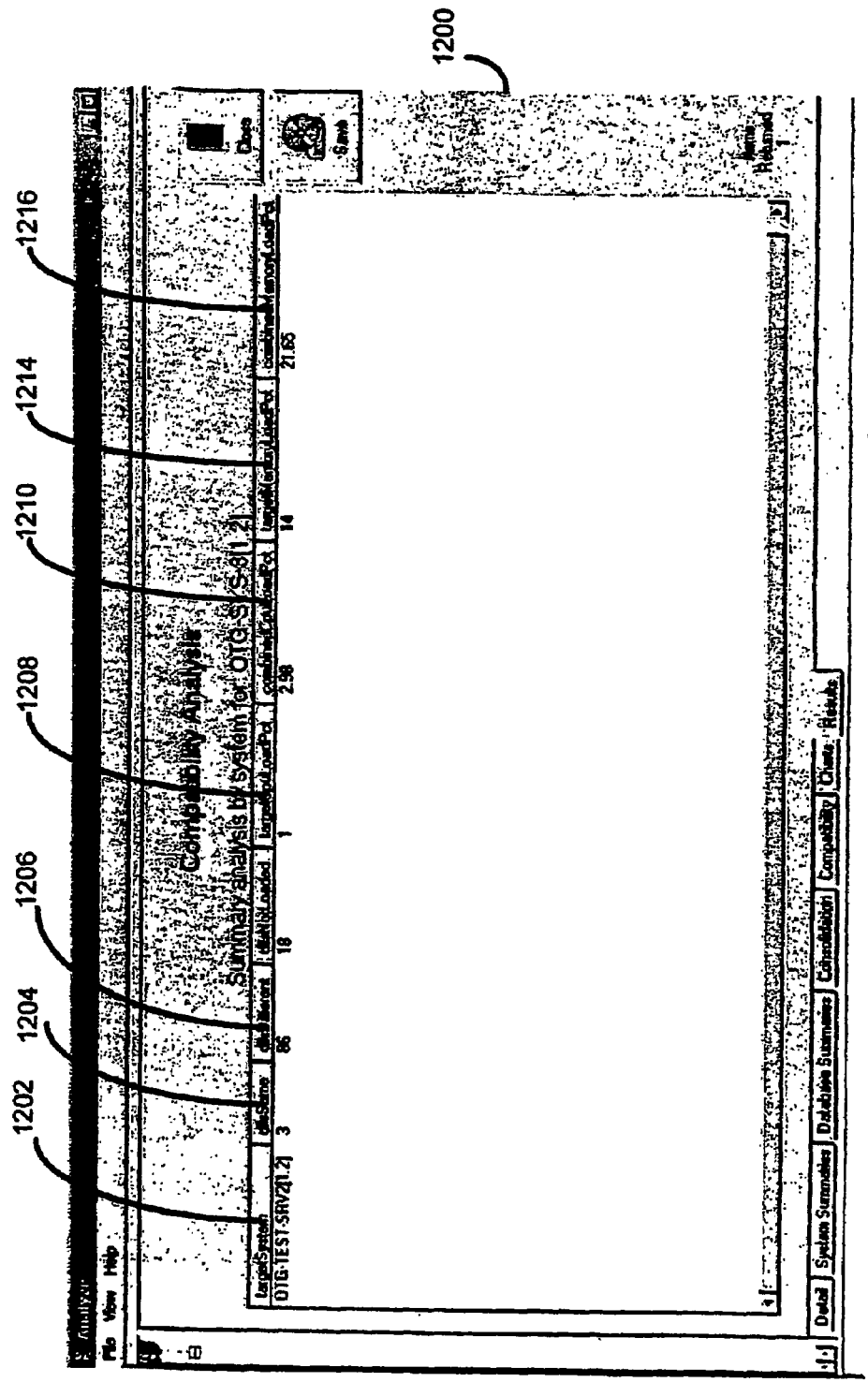
FIG. 12 is an exemplary user interface that indicates results of consolidating a source server to a target server.

FIG. 12 further details the analysis by display indicators of the result of consolidating the source server to the target server. Window 1200 provides the results of the selections made in Window 1100 as shown in FIG. 11. Window 1200 displays the results of consolidating selected source server OTG-TEST-SRV3[1.2] on to target server OTG-TEST-SRV2 [1.2]. The target system is displayed in column 1202. Column 1204 indicates how many DLLs are the same on the source and target servers and column 1206 indicates how many common DLLs are different. A common DLL is one that is used by all applications in the system, e.g., by being located in the Windows System32 directory. Column 1208 indicates the target load percentage prior to consolidation and column 1210 indicates the target load percentage after consolidation. CPU utilization values from the source server are normalized to the processing power of the target server. Similarly columns 1214 and 1216 display the impact on the memory of the target machine. Memory load values from the source server are normalized to the size of the memory on the target server. This display allows a user to quickly determine if the consolidation of the source server to the target server keeps the target server within utilization targets and also provides an indication of how many additional DLLs will need to be loaded onto the target server to support the applications moved from the source server.

Figure 13:
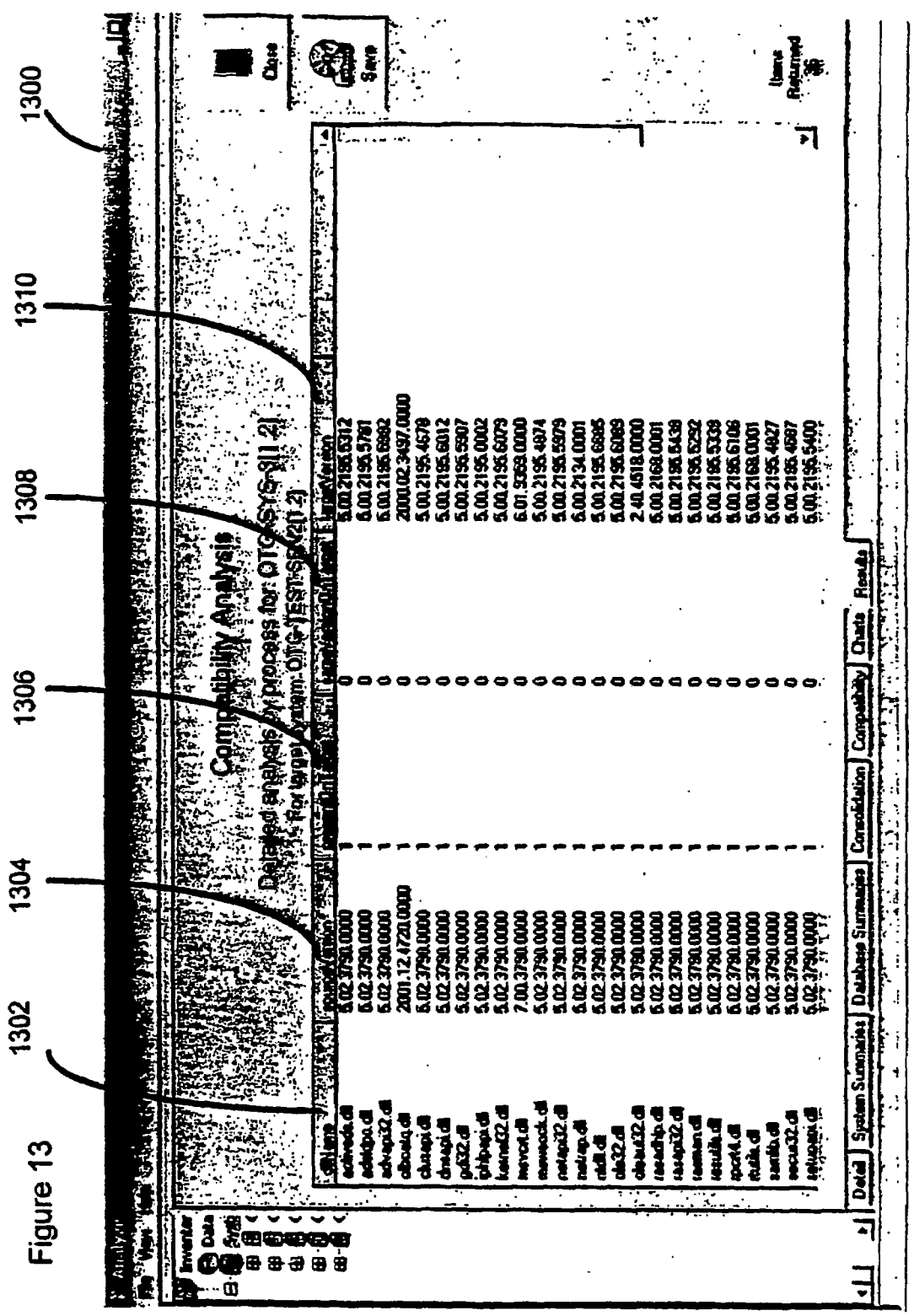
FIG. 13 is an exemplary user interface that displays the results of the process analysis.

In addition to system compatibility, process compatibility is an important consideration in determining which servers to consolidate. When the Process compatibility detail choice 1106 is made in pane 1100 of FIG. 11, the source system processes list box 1112 is enabled, and the user chooses one or more of the processes. The user then chooses a single target server from the Target Systems list box 1110. FIG. 13 provides a UI that displays the result of the process analysis and assists a user in determining process compatibility. Window 1300 displays a comparison of common DLL compatibility and differences on the source and target server. Column 1302 displays the common DLL name, column 1204 displays its version and column 1306 indicates whether that column is present ("1") or absent ("0") on the target server. Moreover, even if the DLL is present on the target server, column 1308 provides and indication of whether the versions on the source and the target are the same ("1") or different ("0"). When the version of the DLL on the target system is different, column

1310 contains the version that was found on the target system. As is illustrated in here, many of the DLLs on the source are also present on the target server; however, the target version does not match the source version. Columns 1304 and 1310 provide the version of the source and the target DLL versions, respectively. In this way, a user can quickly determine whether the target version is a newer version of the DLL, perhaps alleviating the need to update.

Figure 14:
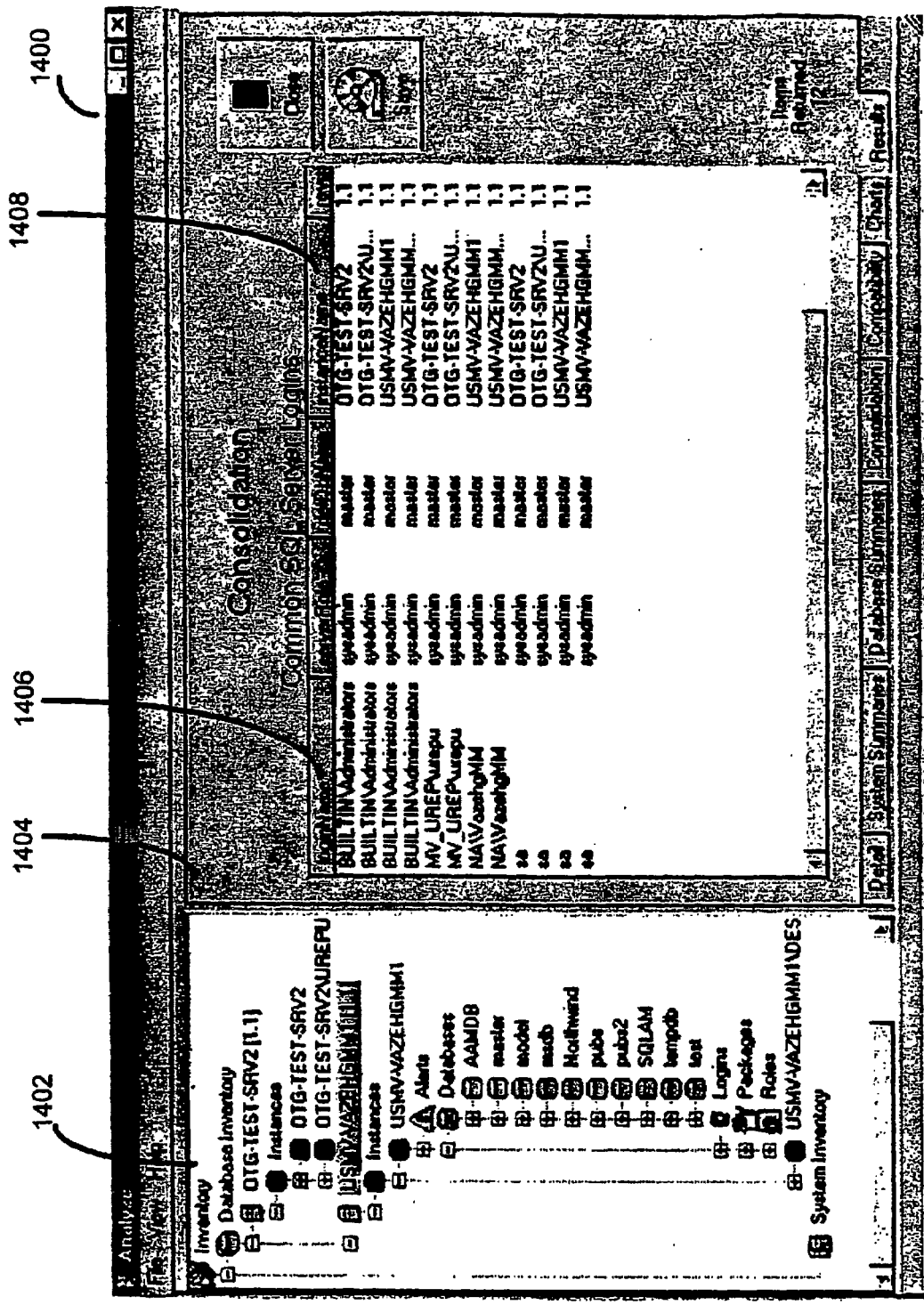
FIG. 14 is an exemplary user interface for use in database consolidation and provide information on common SQL logins.
Figure 15:
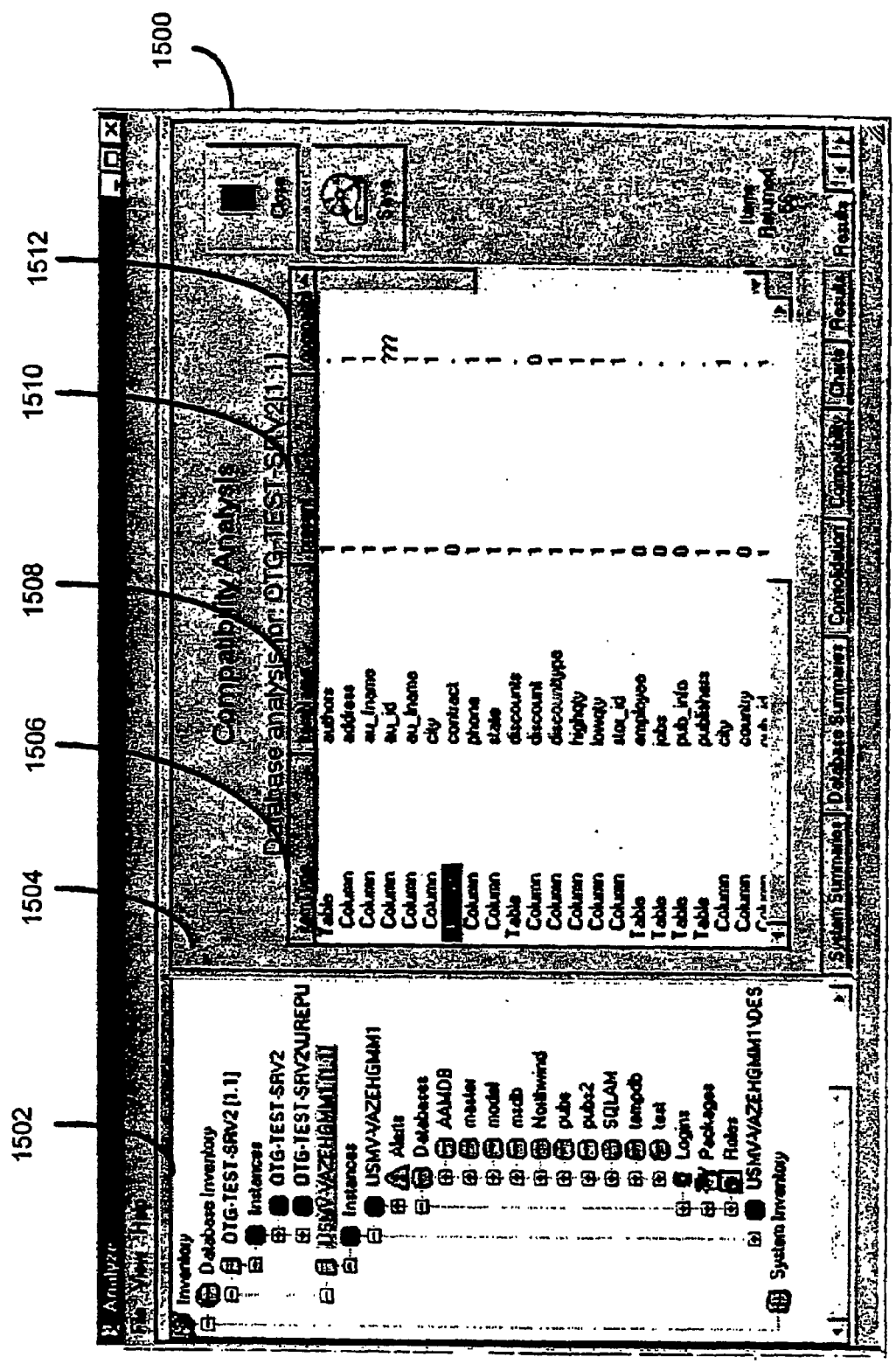
FIG. 15 is an exemplary user interface for use in a database consolidation and provides information on table and column compatibility.

FIGS. 14 and 15 provide many of the same analysis tools as those provided above in the context of database consolidation. In addition to consolidating applications and processes on servers, database consolidation is also an important aspect of consolidation. Database consolidation requires an understanding of how database schemas vary among databases or database instances on various servers. More particularly, database consolidation may be available by the recognition that multiple database, while not identical, may have enough information in common that can be combined. This commonality requires, at least initially, that the target database have all of the columns in the source database or a sufficient number of columns of the source database and the ability to add columns and or table from the source database. Thereafter, addition needs can be addressed such as moving triggers, stored procedures, alerts and the like to the target database.

FIG. 14 provides a high level view of the common SQL server logins. In this example, window 1400 is divided into two panes 1402 and 1404. Pane 1402 provides a listing of database inventory that was collected for the servers during discovery as indicated above. Pane 1404 list all of the common SQL Logins that were discovered on the multiple servers in the server farm, e.g., 110. Column 1406 provides the login name for the databases. Column 1408 provides the instance name. Hence a user can easily determine which databases with common login names are on which servers.

When the database Compatibility details choice 1114 is made in pane 1100 of FIG. 11, the user can perform database compatibility analysis. FIG. 15 provides additional information necessary to analyze database compatibility. In this example, window 1500 provides two panes 1502 and 1504. Pane 1502 is identical to pane 1402. Pane 1504 provides a listing of table and column names and provides an indication of schema commonality and differences. Column 1508 provides a listing of table names and columns names for the tables in question. Column 1506 provide a item type that identifies whether the item listed in column 1508 is a database table or database column. Column 1510 provides an indication whether the item in column 1508 is present on ("1") or absent from ("0") the target server. Column 1512 provides an indication whether the items on the source and the target are compatible ("1"), incompatible ("0"), or whether that cannot be determined ("???").

Figure 16A:
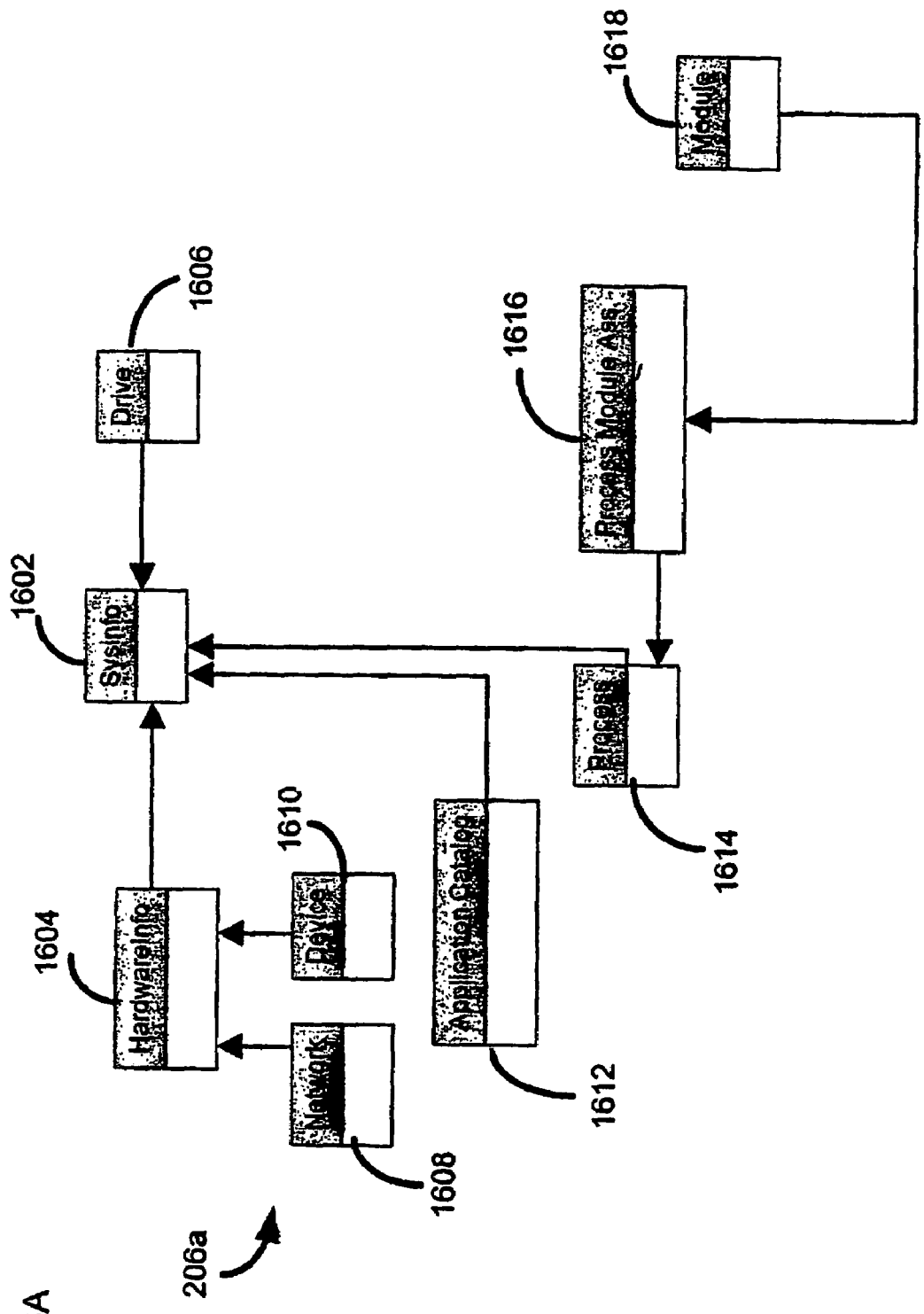
FIG. 16A is an example of a system and application database model for use in analysis of system and application compatibility.
Figure 16B:
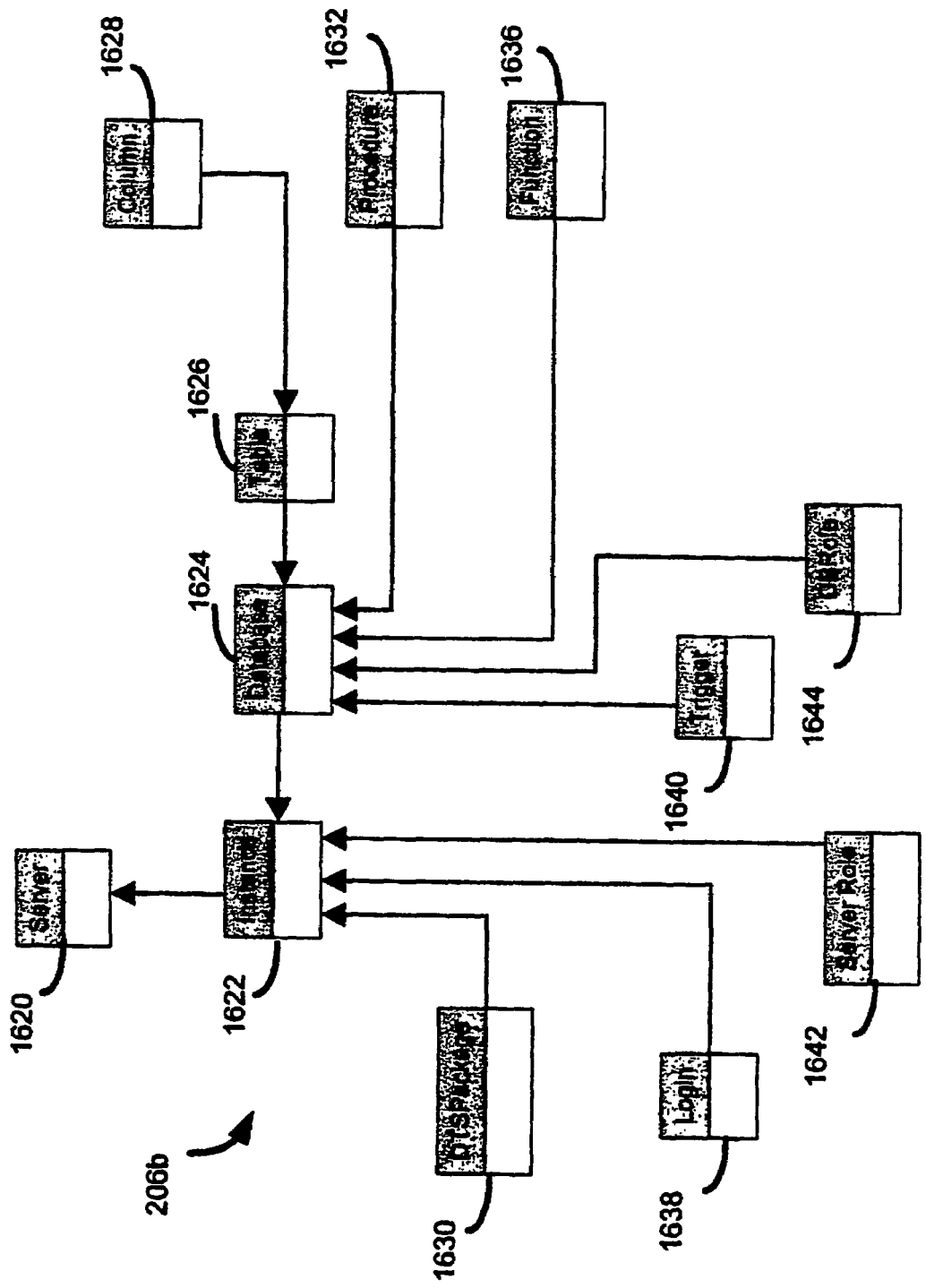
FIG. 16B is an example of a database model for use in database compatibility and consolidation analysis.

FIGS. 16A and 16B provide further details on the implementation of the analysis tools described above. In particular, the selected XML files for the selected system and database inventory are loaded into database 206 (See FIG. 2). SQL queries are then run against the data in the database to perform the analysis, i.e., to compare inventory in one server with the inventory in another server. FIG. 16A provides a high level view of a schema 206a that could be used to store the collected XML data. The schema illustrates the kind of tables that could be used. The XML data could be loaded in the SQL database according to know techniques such as XML Bulk Load or other SQLXML commands.

Preferably, a more flexible approach would be used. In such an implementation, an XML loader uses Microsoft XMLParser to parse the XML contents into datasets. The datasets are then used to build relational records and stored into a relational database, e.g., database 206.

Schema 206a contains Sysinfo table 1602 which contains information such as the system name, make, and model number, system memory information, as well as information about the source of the data, i.e., which XML file and version number. HardwareInfo table 1604 contains server hardware information such as number of processors and available processors. Network table 1608 contains a variety of network information such as NIC identifiers, IP addresses, and so on. Device table 1610 contains information on hardware devices such as device names. Drive table 1606 contains server drive information such as total byte storage, bytes free, volume name, and so on. Application table 1612 contains information such as application name and version number. Process table 1614 contains information on processes such as process owner, cpu utilization information, memory utilization information, and so on. Module table 1618 contains module information such as module size, module name, and so on. Process Module Association table 1616 associates modules with parent processes.

Schema 206a is useful in performing system inventory analysis for such things as application consolidation. With respect to database analysis, FIG. 16B illustrates an high level schema for use with the database inventory XML files. As such, selected database XML files that were discovered from the various servers as described above are loaded into database 206 in accordance with schema 206b. Server table 1620 keeps the information identifying which server maintains the discovered database. Instance table 1622 keeps information on the names of one or more instances of database servers installed on the server, e.g., SQL Server 6.0 and SQL Server 7.0. For each instance, database table 1624 contains information on one or more databases within that instance. For each database in table 1624, Table table 1626 has all of the table names and Column table 1628 maintains all of the columns for a given table. Procedure table 1632 maintains information such as the names of stored procedures used in a database. Function table 1636 maintains a list of function names associated with a database. Trigger table 1640 maintains a list of trigger names associated with a database. DBRole table 1644 maintains a list of database roles associated with a database. Additionally, for each instance in Instance table 1622, DTSPackage table maintains information related to the data transformation services packages associated with that database such as the name of the package and the owner. Login table 1638 maintains login information such as user name. Finally, Server Role table 1642 maintains information related to the server role such as member name and member SID.

Figure 17:
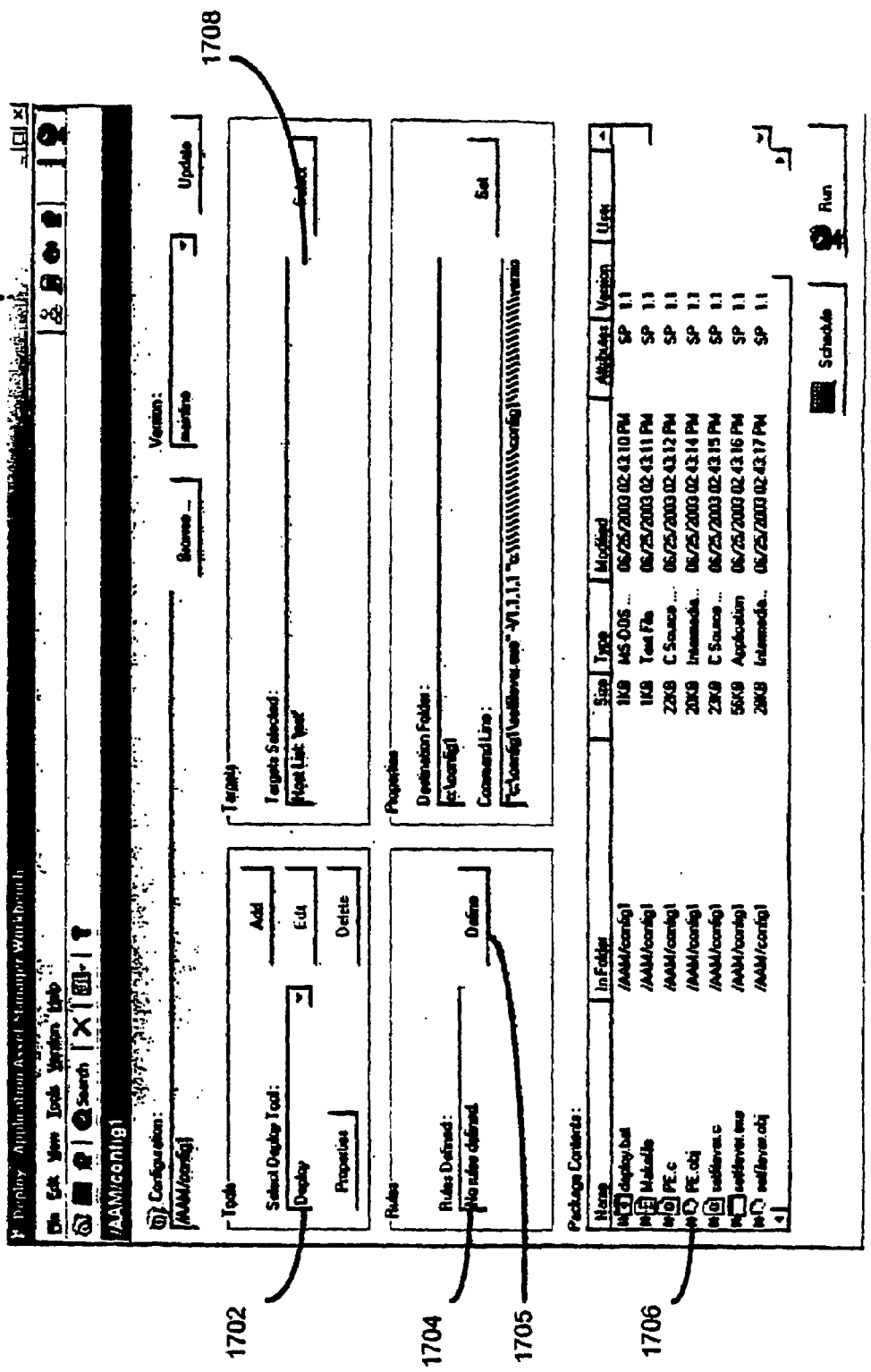
FIG. 17 is an exemplary user interface for use in deploying applications to computer systems in a network such as in the deployment of applications in a server consolidation.
Figure 18:
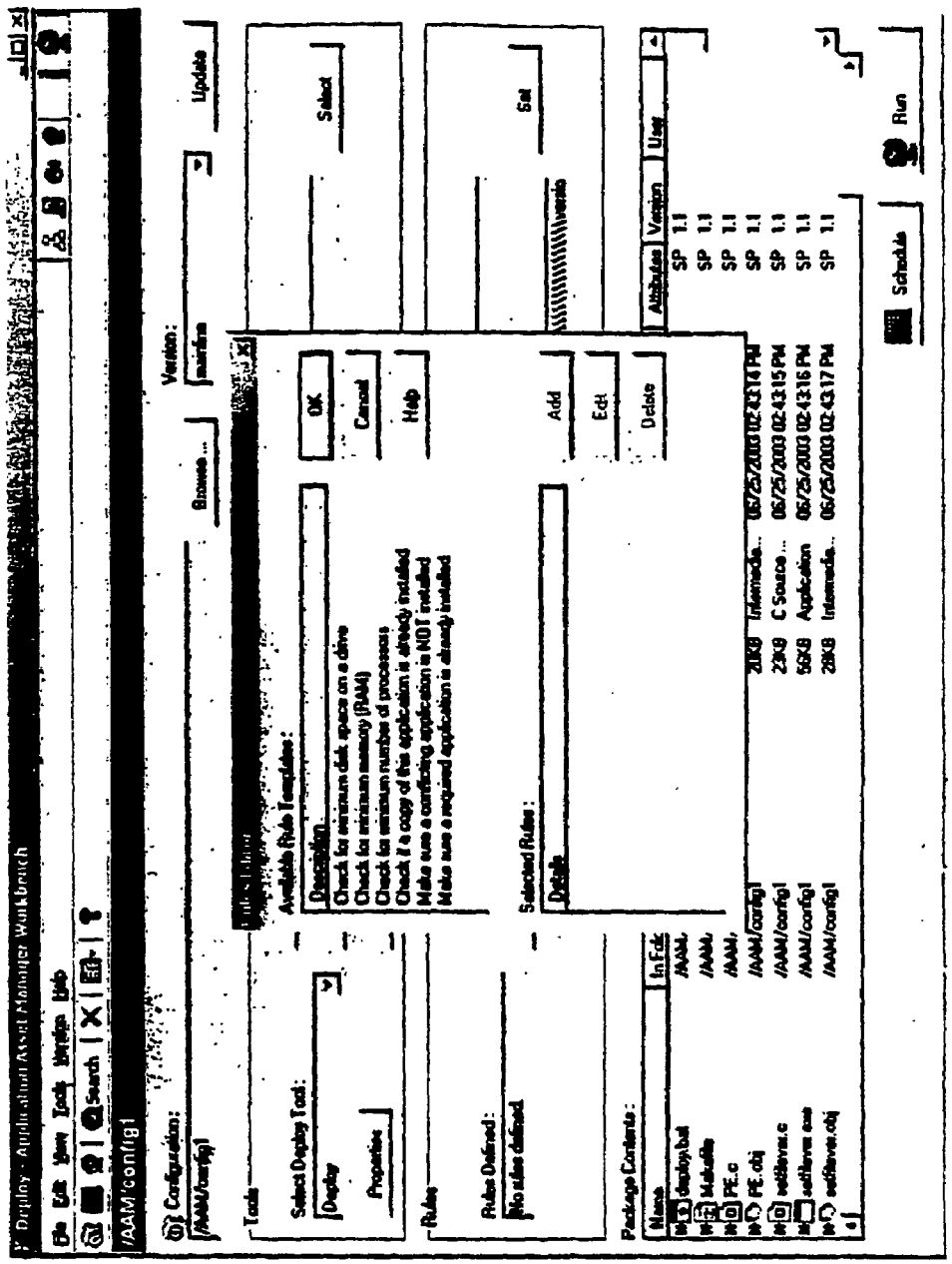
FIG. 18 is an exemplary user interface for selecting deployment rules in connection with application deployment.

After the analysis has been completed and consolidation candidates have been identified, there may be a significant number of files that have to moved and/or loaded on the target server. FIGS. 17 and 18 illustrate aspects of the subject system that assist in automating at least aspects of the deployment of the new assets to a target server. FIG. 17 provides an example asset deployment UI. Window 1700 has drop down box 1702 wherein deployment tool has been selected. Select box 1708 provides a mechanism for a user to identify a target server to which assets are to be deployed. Pane 1706 identifies all of the various assets to be deployed on the target server. Notably, box 1704 provides a user with the capability to define deployment rules to be used in association with the deployment of assets on the target server.

After a user has determined that deployment rules should be used, selecting define button 1705 causes a rules editor to launch. FIG. 18 further illustrates the rules editor. Window 1800 provides an example listing of predefined rules templates including the following template:

Check for minimum disk space on a drive;
Check for minimum memory (RAM);
Check for minimum number of processors;
Check if a copy of this application is already installed;
Make sure that a conflicting application is NOT installed;
Make sure that a required application is already installed.

Of course other rule templates could be defined without departing from the scope of this aspect of the subject system.

Figure 19:
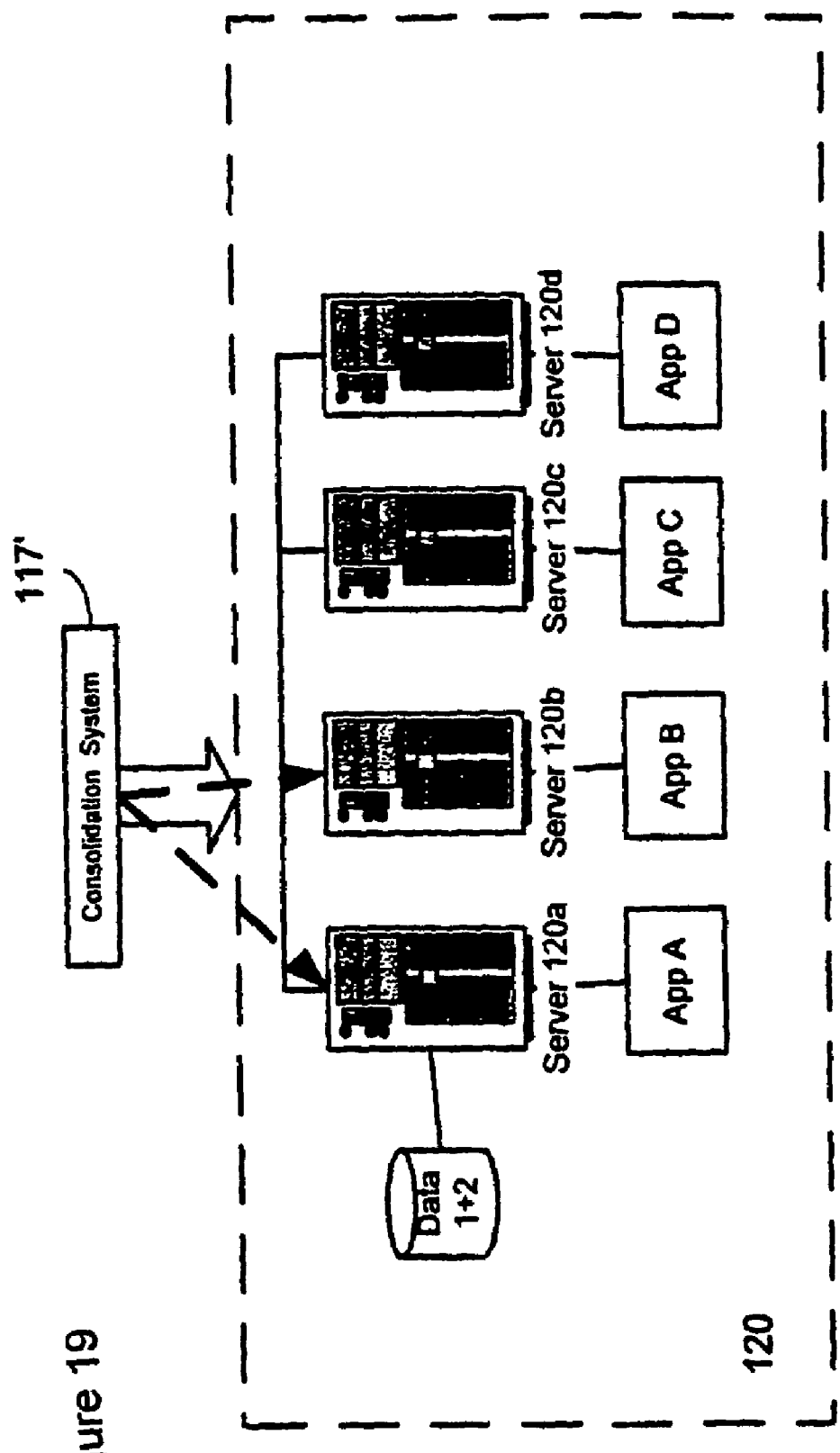
FIG. 19 is an block diagram illustrating the deployment of application in a server consolidation application.

FIG. 19 further illustrates aspects of the deployment system. Here, consolidation information has been collected and analyzed, as described herein above. Thereafter, the consolidated server farm 120 is to be deployed. To that end, all of the executables, binaries, and essentially all of the files necessary to perform an installation are placed into a folder with a setup file. Typically this will be a single application per folder but need not be so limited. Additionally, the templates are selected for the deployment. For example, if minimum memory is selected, then a user will define the minimum memory requirements, e.g., 512 MB. Similarly parameters are defined for other selected templates, e.g., 2 processors, 1 gigabytes of disk space, and so on. At some point, the target servers are selected for deployment. As illustrated in FIG. 19, servers 120a and 120b were selected. Alternatively an entire domain may be selected. As described above in connection with the discovery aspects of the system, the assets of the target systems are discovered. This could have been performed as part of the initial consolidation process or could be performed independently.

The relevant XML files containing the discovered information is then parsed and compared to the defined rules. If the rules pass, the files are transmitted to the target server or servers and the installation and a remote procedure call is made to start the installation. Preferably, the transmitted install files are compressed before transmitting and decompressed on the target. Preferably the compression is performed by ZIPPING the configuration files before transmission and unZIPPING the configuration folders at the target server. The unzip program may be sent as part of the process, for example, by bundling the unzip program as a self extracting file.

Preferably, the testing of the defined rules is performed by an XPATH query against the XML file. For example, using the example XML file defined above in connection with the discovery, an XPATH query for the number of processors would return a "2" if applied against the below XML excerpt:

```
<PE_HdweInfo ID="HI" parent_ID="5008DJUL1030-SI" numberOfProcessors="2"
availableProcessorMask="3" processorLevel="15" processorRevision="521">
    <PE_ProcessorSpeed parent_ID="HI" procNum="0" speed="2992" />
    <PE_ProcessorSpeed parent_ID="HI" procNum="1" speed="2992" />
<PE_Device parent_ID="HI" deviceLocation="LPT1" cmpLocation="">
    <deviceName>Printer Port Logical Interface</deviceName>
    </PE_Device>
<PE_Device parent_ID="HI" deviceLocation="USB Device" cmpLocation="">
    <deviceName>ViewSonic Color Pocket PC V37</deviceName>
    </PE_Device>
<PE_Device parent_ID="HI" deviceLocation="" cmpLocation="0,0,0,1">
    <deviceName>HL-DT-ST RW/DVD GCC-4480B</deviceName>
    </PE_Device>
...
```

Similar XPATH queries could be applied for other rule values.

The above deployment may be used in contexts other than the consolidation context. For example, a company may want to deploy an application across a number of client machines throughout its organization. The above technique would allow a single deployment setup to automatically install the applications on the selected machines that meet the defined rules.

The above consolidation in an example description only and is not intended to indicate that applications and databases are consolidated in all server consolidations. Rather, the example is intended to indicate the breath of consolidation that may be possible. The overarching theme is that consolidation 115 provides the tools to determine the inventory of hardware, software, and data on a server farm such as server farm 110 and simplify the consolidation of that hardware, software and data.

Elements of embodiments of the invention described below may be implemented by hardware, firmware, software or any combination thereof. The term hardware generally refers to an element having a physical structure such as electronic, electromagnetic, optical, electro-optical, mechanical, electro-mechanical parts, while the term software generally refers to a logical structure, a method, a procedure, a program, a routine, a process, an algorithm, a formula, a function, an expression, and the like. The term firmware generally refers to a logical structure, a method, a procedure, a program, a routine, a process, an algorithm, a formula, a function, an expression, and the like that is implemented or embodied in a hardware structure (e.g., flash memory, ROM, EROM). Examples of firmware may include microcode, writable control store, and micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include programs, code, data, files, and the like.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, and the like. A software module is coupled to another module to receive variables, parameters, arguments, pointers, etc. and/or to generate or pass results, updated variables, pointers, and the like. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Embodiments of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

Those skilled in the art also will readily appreciate that many additional modifications are possible in the exemplary embodiment without materially departing from the novel teachings and advantages of the invention. Any such modifications are intended to be included within the scope of this invention as defined by the following exemplary claims.

What is claimed:

1. A method for consolidating computing devices, comprising:
    sending a discovery agent over a network connection to at least one computing device;
    receiving a first data set from the discovery agent indicative of characteristics of the at least one computing device;
    displaying, on a display of a user computing device, at least one difference between the first data set and a second data set, wherein the second data set is from a second computing device other than the at least one computing device that was the source of the first data set and the first data set comprises information indicative of at least one application resident on the at least one computing device and the second data set comprises information indicative of at least one application resident on the second computing device;
    installing a version of the at least one application resident on the at least one computing device on the second computing device;
    removing at least one application resident on the at least one computing device; and
    removing the discovery agent from the at least one computing device.

2. The method as recited in claim 1 wherein the second data set is from the same computing device that was the source of the first data set but from a different time.

3. The method as recited in claim 1 wherein the at least one computing device is a server computer among a plurality of server computers.

4. The method as recited in claim 1 wherein at least one of the first and second data sets comprises information indicative of at least one process executing on the at least one computing device.

5. The method as recited in claim 1 wherein the act of displaying at least one difference between the first and second data sets comprises displaying an indication of a difference in the at least one application in both the first data set and the second data set.

6. The method of claim 4 comprising installing a version of the at least one process on a second computer.

7. The method as recited in claim 1 wherein the first data set comprises information indicative of at least one database.

8. The method as recited in claim 7 wherein the information indicative of the at least one database comprises column table information for tables in the at least one database.

9. The method as recited in claim 8 comprising populating a database on a second computer with at least a portion of the table information from the at least one database.

10. The method as recited in claim 1 wherein the act of sending the discovery agent to the at least one computing device comprises sending a remote procedure to the at least one computing device and remotely executing the remote procedure.

11. The method as recited in claim 10 comprising receiving the at least one data set via named pipes.

12. A method of consolidating services performed on a first and second computing device to a second computing device, comprising:
    sending a discovery agent to the first computing device to determine a plurality of services provided by the first computing device;
    receiving a first set of information from the discovery agent indicative of the plurality of services provided by the first computing device;
    comparing the first set of information to a second set of information indicative of a plurality of services provided by a second computing device to determine at least one service provided by the first computing device that is not available on the second computing device;
    changing the services performed by the second computing device to include the at least one service of the plurality of services provided by the first computing device that is not available on the second computing device;
    removing at least one service of the plurality of services provided by the first computing device; and
    removing the discovery agent from the first computing device.

13. The method as recited in claim 12 wherein the discovery agent comprises computer executable instructions for determining system characteristics on the first computing device.

14. The method as recited in claim 13 wherein the system characteristics comprise at least one of: the number of processors, available processors, processor level, devices, disk drive characteristics, disk drive capacity, system name, page size, operating system version, operating system build, and network connectivity.

15. The method as recited in claim 12 wherein the discovery agent comprises computer executable instructions for determining executable process characteristics on the first computing device.

16. The method as recited in claim 15 wherein the process characteristics comprise at least one of: CPU utilization, memory utilization, active processes, active process dependencies, processor usage, memory usage, process creation time, process ID, process owner, process handles, process version, dependency version, process timestamp, process description, and dependency description.

17. The method as recited in claim 12 where the discovery agent is executed by way of a remote procedure call.

18. The method as recited in claim 12 wherein the discovery agent communicates the first set of information by way of named pipes.

19. The method as recited in claim 12 wherein the services comprise an application service provided by the first computing device.

20. The method as recited in claim 12 wherein the services comprise a database service.

21. The method as recited in claim 12 wherein the discovery agent comprises computer executable instructions for determining database characteristics on the first computing device.

22. The method as recited in claim 21 wherein the database characteristics comprise at least one of: roles, users, aliases, rules, functions, user defined datatypes, user messages, tables, views, indexes, extended procedures, stored procedures, and triggers.

* * * * *